United States Patent
Liu et al.

(10) Patent No.: US 10,459,204 B2
(45) Date of Patent: Oct. 29, 2019

(54) OPTICAL IMAGING LENS

(71) Applicant: GENIUS ELECTRONIC OPTICAL (XIAMEN) CO., LTD., Fujian (CN)

(72) Inventors: Xinming Liu, Fujian (CN); Qi Liu, Fujian (CN)

(73) Assignee: GENIUS ELECTRONIC OPTICAL (XIAMEN) CO., LTD., Xiamen, Fujian (CN)

( * ) Notice: Subject to any disclaimer, the term of this patent is extended or adjusted under 35 U.S.C. 154(b) by 0 days.

(21) Appl. No.: 15/915,072

(22) Filed: Mar. 8, 2018

(65) Prior Publication Data
US 2019/0204554 A1 Jul. 4, 2019

(30) Foreign Application Priority Data

Dec. 29, 2017 (CN) .......................... 2017 1 1474937

(51) Int. Cl.
G02B 9/64 (2006.01)
G02B 13/18 (2006.01)
G02B 13/00 (2006.01)
G02B 3/04 (2006.01)

(52) U.S. Cl.
CPC ........... *G02B 13/0045* (2013.01); *G02B 3/04* (2013.01); *G02B 9/64* (2013.01)

(58) Field of Classification Search
CPC ...... G02B 3/02; G02B 13/04; G02B 13/0045; G02B 9/64

USPC ......................................... 359/708, 751, 755
See application file for complete search history.

(56) References Cited

U.S. PATENT DOCUMENTS

2016/0320594 A1 11/2016 Baik
2019/0025549 A1* 1/2019 Hsueh ................ G02B 13/0045

FOREIGN PATENT DOCUMENTS

| CN | 104597582 | 4/2017 |
|---|---|---|
| JP | 2015141267 | 8/2015 |
| TW | 1545366 | 8/2016 |
| TW | 1631382 | 8/2018 |

OTHER PUBLICATIONS

"Office Action of Taiwan Counterpart Application," dated Nov. 26, 2018, p. 1-10.

* cited by examiner

*Primary Examiner* — William Choi
(74) *Attorney, Agent, or Firm* — JCIPRNET

(57) ABSTRACT

An optical imaging lens including first, second, third, fourth, fifth, sixth, and seventh lens elements arranged in sequence from an object side to an image side is provided. Each lens element includes an object-side surface and an image-side surface. The first lens element has positive refracting power, and a periphery region of the image-side surface of the first lens element is concave. An optical axis region of the image-side surface of the second lens element is concave. A periphery region of the object-side surface of the third lens element is concave. An optical axis region of the image-side surface of the sixth lens element is concave.

20 Claims, 30 Drawing Sheets

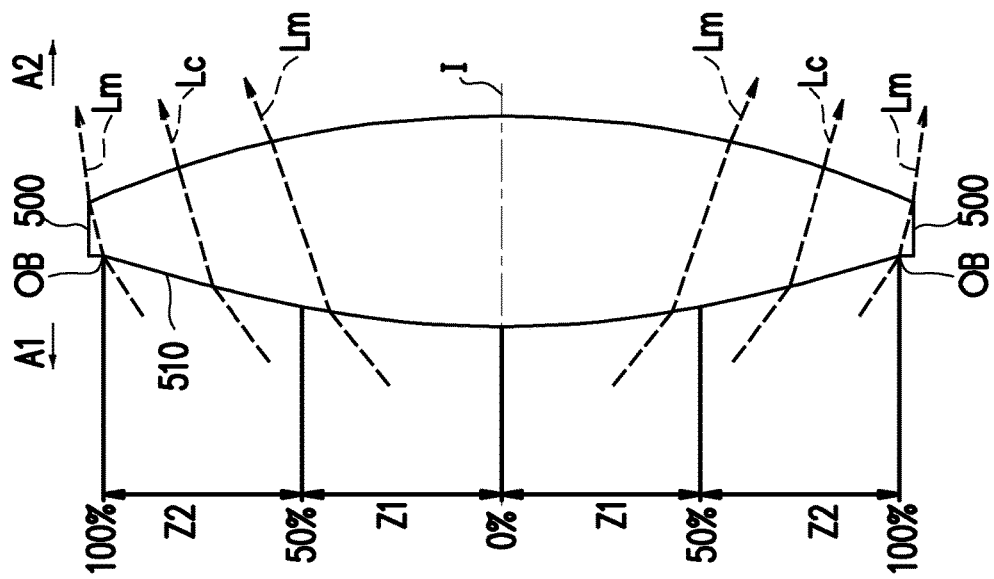
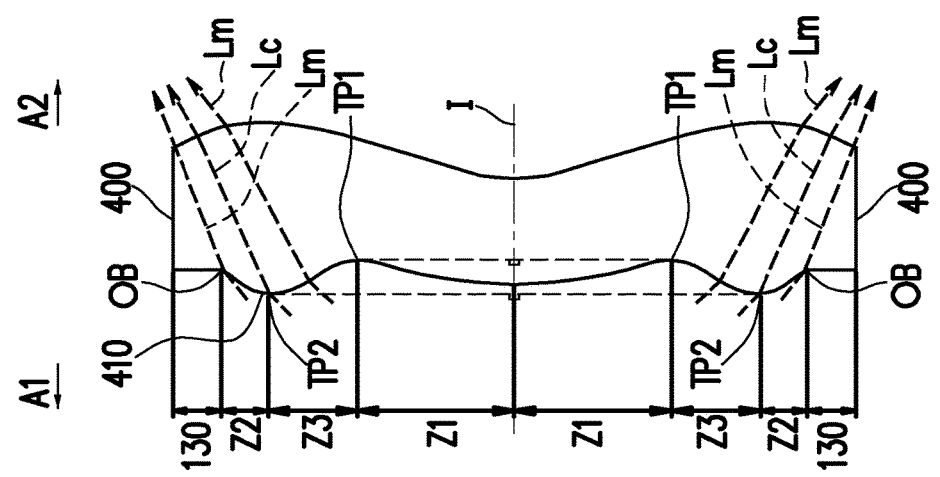
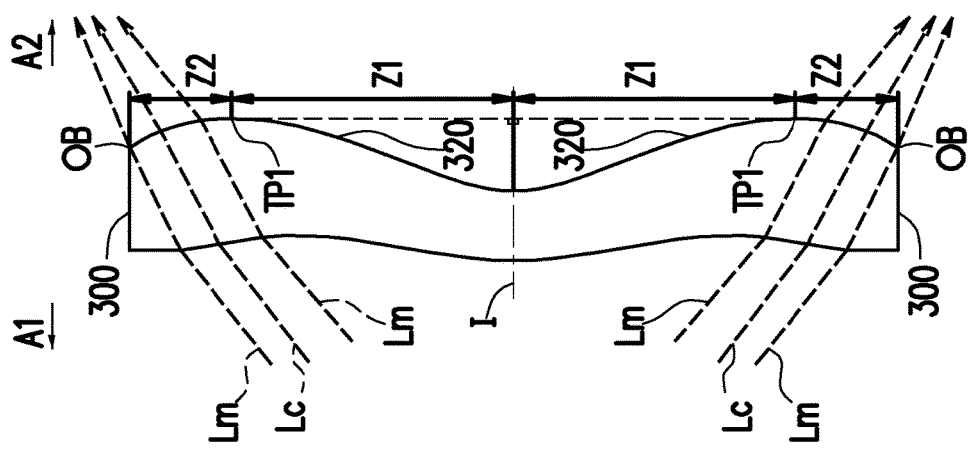
FIG. 5
FIG. 4
FIG. 3

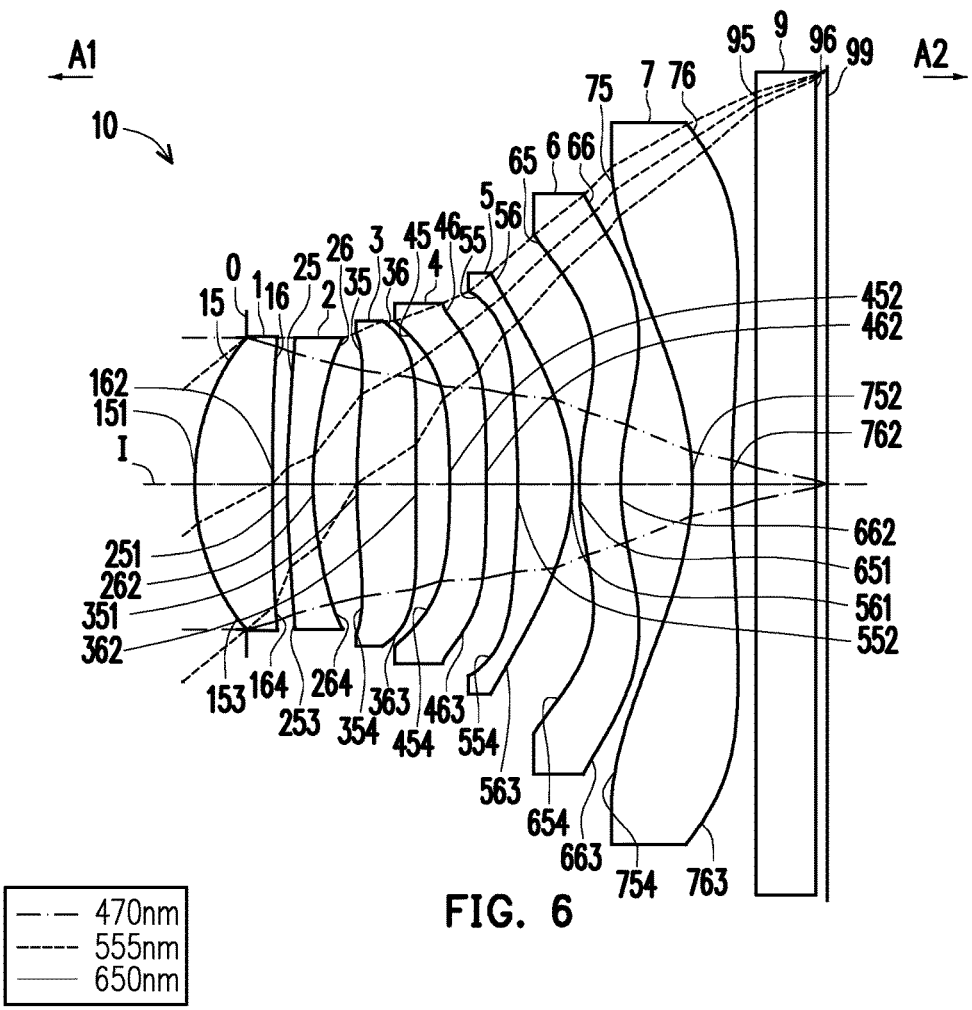
FIG. 6
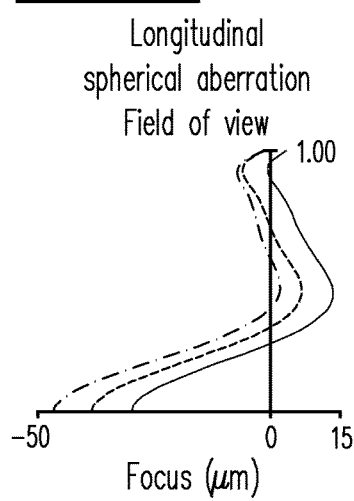
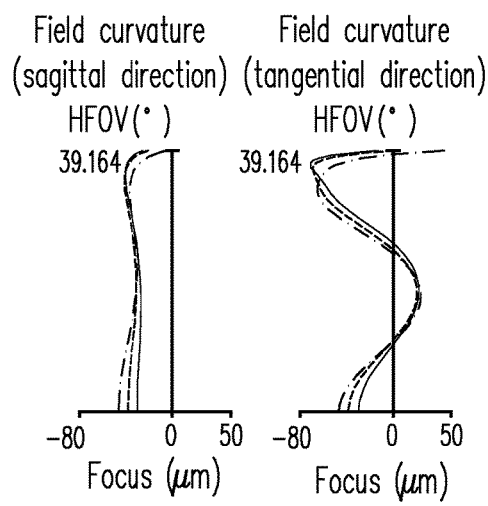
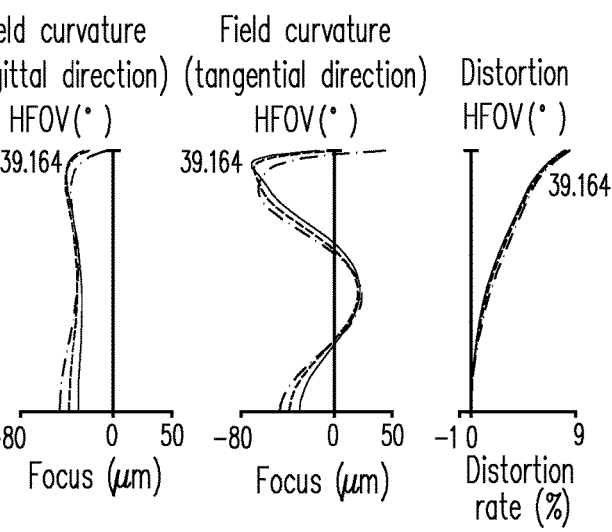
FIG. 7A  FIG. 7B  FIG. 7C  FIG. 7D

| First embodiment | | | | | | |
|---|---|---|---|---|---|---|
| System length= 5.333 mm, Effective focal length=3.919 mm, Half field of view=39.164°, Image height=3.500 mm, F-number=1.622 | | | | | | |
| Element | Surface | Radius (mm) | Thickness (mm) | Refractive index | Abbe number | Focal length (mm) |
| Object | | Infinity | Infinity | | | |
| Aperture 0 | | Infinity | -0.434 | | | |
| First lens element 1 | Object-side surface 15 | 2.038 | 0.656 | 1.545 | 55.987 | 3.936 |
| | Image-side surface 16 | 34.706 | 0.122 | | | |
| Second lens element 2 | Object-side surface 25 | 5.382 | 0.219 | 1.642 | 22.409 | -7.588 |
| | Image-side surface 26 | 2.527 | 0.369 | | | |
| Third lens element 3 | Object-side surface 35 | 5.536 | 0.498 | 1.545 | 55.987 | 11.459 |
| | Image-side surface 36 | 46.317 | 0.283 | | | |
| Fourth lens element 4 | Object-side surface 45 | -11.081 | 0.311 | 1.642 | 22.409 | -16.827 |
| | Image-side surface 46 | 648.571 | 0.269 | | | |
| Fifth lens element 5 | Object-side surface 55 | -5.215 | 0.456 | 1.545 | 55.987 | 4.496 |
| | Image-side surface 56 | -1.721 | 0.061 | | | |
| Sixth lens element 6 | Object-side surface 65 | 2.192 | 0.348 | 1.642 | 22.409 | 56.726 |
| | Image-side surface 66 | 2.186 | 0.602 | | | |
| Seventh lens element 7 | Object-side surface 75 | -2.450 | 0.335 | 1.531 | 55.745 | -3.682 |
| | Image-side surface 76 | 10.320 | 0.200 | | | |
| Filter 9 | Object-side surface 95 | Infinity | 0.510 | 1.523 | 54.512 | |
| | Image-side surface 96 | Infinity | 0.095 | | | |
| | Image plane 99 | Infinity | | | | |

FIG. 8

| Surface | K | $a_2$ | $a_4$ | $a_6$ | $a_8$ |
|---|---|---|---|---|---|
| 15 | 0.000000E+00 | 0.000000E+00 | 3.143165E-03 | 4.583743E-03 | -6.228890E-04 |
| 16 | 0.000000E+00 | 0.000000E+00 | -4.814910E-03 | 2.390205E-02 | -1.548231E-02 |
| 25 | -9.814690E+01 | 0.000000E+00 | -4.020367E-02 | 4.537271E-02 | -1.705119E-02 |
| 26 | -1.280225E+01 | 0.000000E+00 | -1.827246E-02 | 3.006295E-02 | -1.394360E-04 |
| 35 | 7.712983E+00 | 0.000000E+00 | -4.587135E-02 | 1.011902E-02 | -2.809312E-02 |
| 36 | -7.102731E+00 | 0.000000E+00 | -2.137368E-02 | -1.365873E-02 | -1.021705E-02 |
| 45 | 6.134056E+01 | 0.000000E+00 | -8.868424E-02 | -8.160033E-03 | 1.360666E-02 |
| 46 | -8.033318E-01 | 0.000000E+00 | -6.004816E-02 | -2.575752E-02 | 5.809029E-03 |
| 55 | -7.076798E+01 | 0.000000E+00 | 4.340850E-02 | -4.792893E-02 | 8.862847E-03 |
| 56 | -2.415572E+00 | 0.000000E+00 | -1.752268E-03 | -3.929990E-04 | 8.806550E-04 |
| 65 | -4.672744E+00 | 0.000000E+00 | -7.910712E-02 | -7.688504E-04 | 1.186914E-03 |
| 66 | -4.166451E-01 | 0.000000E+00 | -1.090658E-01 | 1.253215E-02 | -7.370612E-04 |
| 75 | -4.853997E-01 | 0.000000E+00 | 2.448055E-02 | -3.545115E-04 | -1.065948E-04 |
| 76 | -6.271607E+01 | 0.000000E+00 | -1.012454E-02 | 1.986535E-03 | -2.804335E-04 |
| Surface | $a_{10}$ | $a_{12}$ | $a_{14}$ | $a_{16}$ | |
| 15 | -1.341498E-03 | 6.854292E-04 | 7.410958E-04 | -3.312542E-04 | |
| 16 | 1.478401E-03 | 2.383716E-03 | 3.626132E-04 | -7.043594E-04 | |
| 25 | -2.858078E-03 | 3.935729E-03 | 8.692617E-04 | -1.155447E-03 | |
| 26 | -9.243270E-03 | 2.106317E-03 | 4.467414E-03 | -1.706566E-03 | |
| 35 | 7.563503E-03 | 3.768627E-03 | -1.767954E-03 | -1.219356E-04 | |
| 36 | 8.268258E-04 | 2.024841E-04 | -9.168837E-04 | 2.588974E-04 | |
| 45 | -8.756917E-03 | -4.159181E-03 | 2.599437E-03 | 3.534130E-04 | |
| 46 | 2.245742E-03 | -6.220427E-04 | -6.119349E-04 | 3.225916E-04 | |
| 55 | 9.175153E-04 | -5.066265E-04 | -1.383185E-04 | 1.481501E-05 | |
| 56 | 1.468910E-05 | -2.484452E-05 | -9.008148E-06 | 1.158733E-06 | |
| 65 | 2.191309E-04 | -4.191604E-06 | -1.044182E-05 | 8.984602E-07 | |
| 66 | -9.114622E-06 | 6.080443E-06 | -6.990760E-07 | 1.930772E-08 | |
| 75 | 1.856289E-05 | 6.076217E-07 | -2.657853E-07 | 1.506516E-08 | |
| 76 | 1.201673E-06 | 9.874390E-07 | 4.887508E-08 | -5.120686E-09 | |

FIG. 9

| Second embodiment ||||||
|---|---|---|---|---|---|
| System length= 5.402 mm, Effective focal length=3.994 mm, Half field of view=37.451°, Image height=3.500 mm, F-number=1.616 ||||||
| Element | Surface | Radius (mm) | Thickness (mm) | Refractive index | Abbe number | Focal length (mm) |
| Object | | Infinity | Infinity | | | |
| Aperture 0 | | Infinity | -0.460 | | | |
| First lens element 1 | Object-side surface 15 | 2.005 | 0.656 | 1.545 | 55.987 | 3.832 |
| | Image-side surface 16 | 42.030 | 0.141 | | | |
| Second lens element 2 | Object-side surface 25 | 5.112 | 0.220 | 1.642 | 22.409 | -7.303 |
| | Image-side surface 26 | 2.415 | 0.370 | | | |
| Third lens element 3 | Object-side surface 35 | 5.969 | 0.533 | 1.545 | 55.987 | 12.416 |
| | Image-side surface 36 | 48.201 | 0.265 | | | |
| Fourth lens element 4 | Object-side surface 45 | -11.251 | 0.338 | 1.642 | 22.409 | -16.544 |
| | Image-side surface 46 | 225.247 | 0.258 | | | |
| Fifth lens element 5 | Object-side surface 55 | -5.192 | 0.538 | 1.545 | 55.987 | 4.868 |
| | Image-side surface 56 | -1.823 | 0.099 | | | |
| Sixth lens element 6 | Object-side surface 65 | 2.119 | 0.375 | 1.642 | 22.409 | 27.123 |
| | Image-side surface 66 | 2.242 | 0.539 | | | |
| Seventh lens element 7 | Object-side surface 75 | -2.499 | 0.168 | 1.531 | 55.745 | -3.796 |
| | Image-side surface 76 | 10.858 | 0.200 | | | |
| Filter 9 | Object-side surface 95 | Infinity | 0.510 | 1.523 | 54.512 | |
| | Image-side surface 96 | Infinity | 0.193 | | | |
| | Image plane 99 | Infinity | | | | |

FIG. 12

| Surface | K | $a_2$ | $a_4$ | $a_6$ | $a_8$ |
|---|---|---|---|---|---|
| 15 | 0.000000E+00 | 0.000000E+00 | 2.474040E-03 | 4.431393E-03 | -1.963077E-04 |
| 16 | 0.000000E+00 | 0.000000E+00 | -7.030736E-03 | 2.561665E-02 | -1.541760E-02 |
| 25 | -9.814690E+01 | 0.000000E+00 | -3.554277E-02 | 4.606659E-02 | -1.648517E-02 |
| 26 | -1.280225E+01 | 0.000000E+00 | -8.945120E-03 | 3.292849E-02 | 6.837512E-05 |
| 35 | 7.712983E+00 | 0.000000E+00 | -5.060119E-02 | 1.462061E-02 | -2.479993E-02 |
| 36 | -7.102731E+00 | 0.000000E+00 | -3.955876E-02 | -6.000483E-03 | -1.074497E-02 |
| 45 | 6.134056E+01 | 0.000000E+00 | -1.050031E-01 | -8.915998E-03 | 1.553067E-02 |
| 46 | -8.033318E-01 | 0.000000E+00 | -6.793051E-02 | -2.470994E-02 | 6.145583E-03 |
| 55 | -7.076798E+01 | 0.000000E+00 | 4.448227E-02 | -4.786626E-02 | 9.464595E-03 |
| 56 | -2.415572E+00 | 0.000000E+00 | -3.017671E-04 | 5.872905E-03 | 6.613674E-04 |
| 65 | -4.672744E+00 | 0.000000E+00 | -6.681913E-02 | -7.706861E-04 | 1.224865E-03 |
| 66 | -4.166451E-01 | 0.000000E+00 | -1.051383E-01 | 1.236969E-02 | -7.420462E-04 |
| 75 | -4.853997E-01 | 0.000000E+00 | 2.199130E-02 | -4.029846E-04 | -9.823821E-05 |
| 76 | -6.271607E+01 | 0.000000E+00 | -5.581701E-03 | 6.009511E-04 | -1.408031E-04 |
| Surface | $a_{10}$ | $a_{12}$ | $a_{14}$ | $a_{16}$ | |
| 15 | -1.395531E-03 | 4.815626E-04 | 6.569329E-04 | -2.712361E-04 | |
| 16 | 9.144587E-04 | 2.082956E-03 | 3.944313E-04 | -5.195971E-04 | |
| 25 | -2.949883E-03 | 3.756256E-03 | 7.719049E-04 | -9.089381E-04 | |
| 26 | -8.960132E-03 | 2.405514E-03 | 4.743221E-03 | -1.632950E-03 | |
| 35 | 7.647103E-03 | 3.063336E-03 | -1.912366E-03 | 1.832348E-04 | |
| 36 | 7.047091E-04 | 6.644376E-04 | -7.189832E-04 | 1.633681E-04 | |
| 45 | -7.488463E-03 | -3.875286E-03 | 2.542038E-03 | 2.477746E-04 | |
| 46 | 2.333197E-03 | -5.259402E-04 | -5.999097E-04 | 2.856300E-04 | |
| 55 | 1.206604E-03 | -6.194547E-04 | -1.694127E-04 | 3.950560E-05 | |
| 56 | -1.116496E-04 | -3.793481E-05 | -8.634410E-06 | 2.026211E-06 | |
| 65 | 1.905850E-04 | -8.118244E-06 | -1.035732E-05 | 9.829989E-07 | |
| 66 | -8.272479E-06 | 6.268028E-06 | -6.709070E-07 | 2.614958E-08 | |
| 75 | 1.974119E-05 | 6.623075E-07 | -2.684120E-07 | 1.381334E-08 | |
| 76 | 3.960465E-06 | 7.669046E-07 | 1.970224E-08 | -6.477078E-09 | |

FIG. 13

| Third embodiment | | | | | | |
|---|---|---|---|---|---|---|
| System length= 5.431 mm, Effective focal length=3.932 mm, Half field of view=38.403°, Image height=3.500 mm, F-number=1.639 | | | | | | |
| Element | Surface | Radius (mm) | Thickness (mm) | Refractive index | Abbe number | Focal length (mm) |
| Object | | Infinity | Infinity | | | |
| Aperture 0 | | Infinity | -0.445 | | | |
| First lens element 1 | Object-side surface 15 | 2.053 | 0.643 | 1.545 | 55.987 | 3.957 |
| | Image-side surface 16 | 36.189 | 0.166 | | | |
| Second lens element 2 | Object-side surface 25 | 5.185 | 0.215 | 1.642 | 22.409 | -7.266 |
| | Image-side surface 26 | 2.426 | 0.333 | | | |
| Third lens element 3 | Object-side surface 35 | 5.349 | 0.538 | 1.545 | 55.987 | 10.860 |
| | Image-side surface 36 | 52.431 | 0.286 | | | |
| Fourth lens element 4 | Object-side surface 45 | -11.172 | 0.310 | 1.642 | 22.409 | -17.589 |
| | Image-side surface 46 | -603.718 | 0.257 | | | |
| Fifth lens element 5 | Object-side surface 55 | -6.192 | 0.532 | 1.545 | 55.987 | 4.430 |
| | Image-side surface 56 | -1.793 | 0.100 | | | |
| Sixth lens element 6 | Object-side surface 65 | 2.220 | 0.359 | 1.642 | 22.409 | 92.258 |
| | Image-side surface 66 | 2.159 | 0.544 | | | |
| Seventh lens element 7 | Object-side surface 75 | -2.511 | 0.347 | 1.531 | 55.745 | -3.789 |
| | Image-side surface 76 | 10.801 | 0.160 | | | |
| Filter 9 | Object-side surface 95 | Infinity | 0.510 | 1.523 | 54.512 | |
| | Image-side surface 96 | Infinity | 0.132 | | | |
| | Image plane 99 | Infinity | | | | |

FIG. 16

| Surface | K | $a_2$ | $a_4$ | $a_6$ | $a_8$ |
|---|---|---|---|---|---|
| 15 | 0.000000E+00 | 0.000000E+00 | 2.276093E-03 | 4.493446E-03 | -6.083079E-04 |
| 16 | 0.000000E+00 | 0.000000E+00 | -5.180168E-03 | 2.355790E-02 | -1.555857E-02 |
| 25 | -9.814690E+01 | 0.000000E+00 | -4.054098E-02 | 4.559613E-02 | -1.697886E-02 |
| 26 | -1.280225E+01 | 0.000000E+00 | -1.776752E-02 | 2.950393E-02 | -3.394115E-04 |
| 35 | 7.712983E+00 | 0.000000E+00 | -4.750133E-02 | 1.020498E-02 | -2.779872E-02 |
| 36 | -7.102731E+00 | 0.000000E+00 | -2.082793E-02 | -1.293342E-02 | -9.964334E-03 |
| 45 | 6.134056E+01 | 0.000000E+00 | -8.977984E-02 | -8.646515E-03 | 1.346907E-02 |
| 46 | -8.033318E-01 | 0.000000E+00 | -5.976863E-02 | -2.585689E-02 | 5.708415E-03 |
| 55 | -7.076798E+01 | 0.000000E+00 | 4.256869E-02 | -4.844112E-02 | 8.938401E-03 |
| 56 | -2.415572E+00 | 0.000000E+00 | -5.038180E-03 | 2.378068E-04 | 9.524870E-04 |
| 65 | -4.672744E+00 | 0.000000E+00 | -7.728455E-02 | -1.035848E-03 | 1.161493E-03 |
| 66 | -4.166451E-01 | 0.000000E+00 | -1.116357E-01 | 1.244592E-02 | -7.361261E-04 |
| 75 | -4.853997E-01 | 0.000000E+00 | 2.512123E-02 | -2.762613E-04 | -1.126400E-04 |
| 76 | -6.271607E+01 | 0.000000E+00 | -7.266380E-03 | 1.814415E-03 | -2.720857E-04 |
| Surface | $a_{10}$ | $a_{12}$ | $a_{14}$ | $a_{16}$ | |
| 15 | -1.329480E-03 | 6.868065E-04 | 7.367182E-04 | -3.372888E-04 | |
| 16 | 1.529970E-03 | 2.403811E-03 | 3.849751E-04 | -6.854034E-04 | |
| 25 | -2.974137E-03 | 3.969560E-03 | 8.849428E-04 | -1.148936E-03 | |
| 26 | -9.086119E-03 | 2.081104E-03 | 4.455406E-03 | -1.712966E-03 | |
| 35 | 7.729216E-03 | 3.769754E-03 | -1.766290E-03 | -1.179043E-04 | |
| 36 | 8.663031E-04 | 2.103731E-04 | -9.179650E-04 | 2.581952E-04 | |
| 45 | -8.756028E-03 | -4.171686E-03 | 2.594455E-03 | 3.498465E-04 | |
| 46 | 2.187206E-03 | -6.357140E-04 | -6.166888E-04 | 3.214036E-04 | |
| 55 | 9.773415E-04 | -4.978924E-04 | -1.448810E-04 | 9.469924E-06 | |
| 56 | 1.799537E-05 | -2.297590E-05 | -8.483734E-06 | 1.291210E-06 | |
| 65 | 2.126395E-04 | -3.253877E-06 | -1.022545E-05 | 9.459046E-07 | |
| 66 | -8.025597E-06 | 6.259158E-06 | -6.758492E-07 | 2.375150E-08 | |
| 75 | 1.771351E-05 | 6.286841E-07 | -2.582658E-07 | 1.313367E-08 | |
| 76 | 3.377365E-06 | 1.112041E-06 | 4.748214E-08 | -7.046245E-09 | |

FIG. 17

| Fourth embodiment | | | | | | |
|---|---|---|---|---|---|---|
| System length= 5.384 mm, Effective focal length=3.915 mm, Half field of view=38.801°, Image height=3.500 mm, F-number=1.616 | | | | | | |
| Element | Surface | Radius (mm) | Thickness (mm) | Refractive index | Abbe number | Focal length (mm) |
| Object | | Infinity | Infinity | | | |
| Aperture 0 | | Infinity | -0.427 | | | |
| First lens element 1 | Object-side surface 15 | 2.041 | 0.660 | 1.545 | 55.987 | 3.937 |
| | Image-side surface 16 | 35.423 | 0.129 | | | |
| Second lens element 2 | Object-side surface 25 | 5.354 | 0.216 | 1.642 | 22.409 | -7.431 |
| | Image-side surface 26 | 2.494 | 0.338 | | | |
| Third lens element 3 | Object-side surface 35 | 5.465 | 0.557 | 1.545 | 55.987 | 10.149 |
| | Image-side surface 36 | 370.921 | 0.268 | | | |
| Fourth lens element 4 | Object-side surface 45 | -11.140 | 0.298 | 1.642 | 22.409 | -18.394 |
| | Image-side surface 46 | -174.931 | 0.263 | | | |
| Fifth lens element 5 | Object-side surface 55 | -5.408 | 0.617 | 1.545 | 55.987 | 4.544 |
| | Image-side surface 56 | -1.770 | 0.020 | | | |
| Sixth lens element 6 | Object-side surface 65 | 2.241 | 0.382 | 1.642 | 22.409 | 102.630 |
| | Image-side surface 66 | 2.163 | 0.590 | | | |
| Seventh lens element 7 | Object-side surface 75 | -2.449 | 0.258 | 1.531 | 55.745 | -3.551 |
| | Image-side surface 76 | 8.630 | 0.284 | | | |
| Filter 9 | Object-side surface 95 | Infinity | 0.510 | 1.523 | 54.512 | |
| | Image-side surface 96 | Infinity | -0.007 | | | |
| | Image plane 99 | Infinity | | | | |

FIG. 20

| Surface | K | $a_2$ | $a_4$ | $a_6$ | $a_8$ |
|---|---|---|---|---|---|
| 15 | 0.000000E+00 | 0.000000E+00 | 5.108168E-03 | 3.882799E-03 | -1.207516E-02 |
| 16 | 0.000000E+00 | 0.000000E+00 | -6.919484E-03 | 1.837877E-02 | -1.617350E-03 |
| 25 | -7.295549E+01 | 0.000000E+00 | -6.693347E-02 | 7.514675E-02 | -1.365556E-02 |
| 26 | -1.280225E+01 | 0.000000E+00 | -3.343200E-02 | 6.611988E-02 | -7.164110E-02 |
| 35 | 7.712983E+00 | 0.000000E+00 | -4.154617E-02 | -9.544279E-03 | -6.095893E-03 |
| 36 | -7.102731E+00 | 0.000000E+00 | -1.872052E-02 | -4.278178E-02 | 4.354574E-02 |
| 45 | 6.134056E+01 | 0.000000E+00 | -9.049147E-02 | -1.550466E-02 | -2.321479E-02 |
| 46 | -8.033318E-01 | 0.000000E+00 | -4.533559E-02 | -7.776152E-02 | 8.483737E-02 |
| 55 | -7.076798E+01 | 0.000000E+00 | 4.457095E-02 | -4.783246E-02 | 9.093139E-03 |
| 56 | -2.415572E+00 | 0.000000E+00 | -8.487216E-04 | 6.732999E-04 | 9.258342E-04 |
| 65 | -4.672744E+00 | 0.000000E+00 | -7.465506E-02 | -7.827422E-04 | 1.186039E-03 |
| 66 | -4.166451E-01 | 0.000000E+00 | -1.088122E-01 | 1.256508E-02 | -7.386107E-04 |
| 75 | -4.853997E-01 | 0.000000E+00 | 2.427934E-02 | -3.575364E-04 | -1.066174E-04 |
| 76 | -6.271607E+01 | 0.000000E+00 | -8.911631E-03 | 2.062705E-03 | -2.746846E-04 |
| Surface | $a_{10}$ | $a_{12}$ | $a_{14}$ | $a_{16}$ | |
| 15 | 2.217258E-02 | -1.918160E-02 | 8.446992E-03 | -1.491561E-03 | |
| 16 | -8.725311E-03 | 2.859611E-03 | 2.307622E-03 | -1.154212E-03 | |
| 25 | -4.345637E-02 | 4.466498E-02 | -1.621598E-02 | 1.733378E-03 | |
| 26 | 8.575314E-02 | -7.490494E-02 | 3.861232E-02 | -7.736700E-03 | |
| 35 | 2.074742E-02 | -3.952008E-02 | 2.867648E-02 | -7.140992E-03 | |
| 36 | -3.999306E-02 | 8.834324E-03 | 3.015833E-03 | -1.289720E-03 | |
| 45 | 7.910905E-02 | -8.413175E-02 | 3.556802E-02 | -4.725667E-03 | |
| 46 | -6.734551E-02 | 3.596763E-02 | -1.131325E-02 | 1.653189E-03 | |
| 55 | 9.692752E-04 | -5.184789E-04 | -1.497208E-04 | 1.073679E-05 | |
| 56 | 3.901469E-06 | -2.772683E-05 | -9.419025E-06 | 1.177459E-06 | |
| 65 | 2.162981E-04 | -4.955439E-06 | -1.060967E-05 | 8.581467E-07 | |
| 66 | -9.501419E-06 | 6.010792E-06 | -7.091104E-07 | 1.842899E-08 | |
| 75 | 1.862951E-05 | 6.153524E-07 | -2.651499E-07 | 1.511917E-08 | |
| 76 | 1.350905E-06 | 9.697396E-07 | 4.540105E-08 | -5.520697E-09 | |

FIG. 21

| Fifth embodiment | | | | | | |
|---|---|---|---|---|---|---|
| System length= 5.254 mm, Effective focal length=3.860 mm, Half field of view=39.868°, Image height=3.500 mm, F-number=1.635 | | | | | | |
| Element | Surface | Radius (mm) | Thickness (mm) | Refractive index | Abbe number | Focal length (mm) |
| Object | | Infinity | Infinity | | | |
| Aperture 0 | | Infinity | -0.422 | | | |
| First lens element 1 | Object-side surface 15 | 2.041 | 0.565 | 1.545 | 55.987 | 3.947 |
| | Image-side surface 16 | 34.434 | 0.117 | | | |
| Second lens element 2 | Object-side surface 25 | 5.155 | 0.204 | 1.642 | 22.409 | -7.563 |
| | Image-side surface 26 | 2.472 | 0.385 | | | |
| Third lens element 3 | Object-side surface 35 | 5.481 | 0.531 | 1.545 | 55.987 | 10.846 |
| | Image-side surface 36 | 70.732 | 0.319 | | | |
| Fourth lens element 4 | Object-side surface 45 | -11.088 | 0.297 | 1.642 | 22.409 | -16.563 |
| | Image-side surface 46 | 328.242 | 0.257 | | | |
| Fifth lens element 5 | Object-side surface 55 | -5.634 | 0.461 | 1.545 | 55.987 | 4.426 |
| | Image-side surface 56 | -1.741 | 0.101 | | | |
| Sixth lens element 6 | Object-side surface 65 | 2.213 | 0.340 | 1.642 | 22.409 | 62.793 |
| | Image-side surface 66 | 2.199 | 0.627 | | | |
| Seventh lens element 7 | Object-side surface 75 | -2.450 | 0.199 | 1.531 | 55.745 | -3.555 |
| | Image-side surface 76 | 8.590 | 0.284 | | | |
| Filter 9 | Object-side surface 95 | Infinity | 0.510 | 1.523 | 54.512 | |
| | Image-side surface 96 | Infinity | 0.057 | | | |
| | Image plane 99 | Infinity | | | | |

FIG. 24

| Surface | K | $a_2$ | $a_4$ | $a_6$ | $a_8$ |
|---|---|---|---|---|---|
| 15 | 0.000000E+00 | 0.000000E+00 | 3.116799E-03 | 4.659860E-03 | -5.555639E-04 |
| 16 | 0.000000E+00 | 0.000000E+00 | -4.695509E-03 | 2.386587E-02 | -1.548142E-02 |
| 25 | -9.814690E+01 | 0.000000E+00 | -4.005959E-02 | 4.558155E-02 | -1.697827E-02 |
| 26 | -1.280225E+01 | 0.000000E+00 | -1.811223E-02 | 2.986591E-02 | -2.284258E-04 |
| 35 | 7.712983E+00 | 0.000000E+00 | -4.519786E-02 | 1.034002E-02 | -2.812383E-02 |
| 36 | -7.102731E+00 | 0.000000E+00 | -2.028566E-02 | -1.335779E-02 | -1.012537E-02 |
| 45 | 6.134056E+01 | 0.000000E+00 | -8.931661E-02 | -8.600452E-03 | 1.339420E-02 |
| 46 | -8.033318E-01 | 0.000000E+00 | -5.996914E-02 | -2.573139E-02 | 5.793731E-03 |
| 55 | -7.076798E+01 | 0.000000E+00 | 4.317013E-02 | -4.771436E-02 | 8.944902E-03 |
| 56 | -2.415572E+00 | 0.000000E+00 | -4.279977E-03 | -1.682647E-04 | 8.637747E-04 |
| 65 | -4.672744E+00 | 0.000000E+00 | -7.838653E-02 | -1.075300E-03 | 1.191177E-03 |
| 66 | -4.166451E-01 | 0.000000E+00 | -1.082732E-01 | 1.262115E-02 | -7.390033E-04 |
| 75 | -4.853997E-01 | 0.000000E+00 | 2.449874E-02 | -3.559602E-04 | -1.071620E-04 |
| 76 | -6.271607E+01 | 0.000000E+00 | -1.075152E-02 | 2.034803E-03 | -2.778623E-04 |
| Surface | $a_{10}$ | $a_{12}$ | $a_{14}$ | $a_{16}$ | |
| 15 | -1.303703E-03 | 7.043085E-04 | 7.497828E-04 | -3.285951E-04 | |
| 16 | 1.499917E-03 | 2.403954E-03 | 3.752947E-04 | -6.976525E-04 | |
| 25 | -2.833839E-03 | 3.949955E-03 | 8.800020E-04 | -1.143456E-03 | |
| 26 | -9.269680E-03 | 2.093717E-03 | 4.452141E-03 | -1.725095E-03 | |
| 35 | 7.518297E-03 | 3.731106E-03 | -1.793930E-03 | -1.373918E-04 | |
| 36 | 8.416117E-04 | 2.039770E-04 | -9.127719E-04 | 2.646606E-04 | |
| 45 | -8.841148E-03 | -4.190818E-03 | 2.585000E-03 | 3.437540E-04 | |
| 46 | 2.231140E-03 | -6.281594E-04 | -6.128051E-04 | 3.234782E-04 | |
| 55 | 9.647909E-04 | -5.034267E-04 | -1.437900E-04 | 1.863385E-05 | |
| 56 | 1.816863E-06 | -2.779209E-05 | -9.143683E-06 | 1.309412E-06 | |
| 65 | 2.224541E-04 | -3.775098E-06 | -1.035018E-05 | 9.112669E-07 | |
| 66 | -1.063605E-05 | 6.113059E-06 | -7.002480E-07 | 1.981352E-08 | |
| 75 | 1.854520E-05 | 6.061801E-07 | -2.658799E-07 | 1.506070E-08 | |
| 76 | 1.177585E-06 | 9.919016E-07 | 4.958755E-08 | -5.038306E-09 | |

FIG. 25

| Sixth embodiment | | | | | | |
|---|---|---|---|---|---|---|
| System length= 5.316 mm, Effective focal length=3.852 mm, Half field of view=39.100°, Image height=3.500 mm, F-number=1.628 | | | | | | |
| Element | Surface | Radius (mm) | Thickness (mm) | Refractive index | Abbe number | Focal length (mm) |
| Object | | Infinity | Infinity | | | |
| Aperture 0 | | Infinity | -0.416 | | | |
| First lens element 1 | Object-side surface 15 | 2.043 | 0.658 | 1.545 | 55.987 | 3.936 |
| | Image-side surface 16 | 36.277 | 0.124 | | | |
| Second lens element 2 | Object-side surface 25 | 5.398 | 0.215 | 1.642 | 22.409 | -7.534 |
| | Image-side surface 26 | 2.522 | 0.346 | | | |
| Third lens element 3 | Object-side surface 35 | 5.417 | 0.543 | 1.545 | 55.987 | 10.539 |
| | Image-side surface 36 | 88.304 | 0.275 | | | |
| Fourth lens element 4 | Object-side surface 45 | -11.101 | 0.292 | 1.642 | 22.409 | -17.791 |
| | Image-side surface 46 | -310.838 | 0.240 | | | |
| Fifth lens element 5 | Object-side surface 55 | -6.250 | 0.602 | 1.545 | 55.987 | 4.312 |
| | Image-side surface 56 | -1.769 | 0.020 | | | |
| Sixth lens element 6 | Object-side surface 65 | 2.184 | 0.363 | 1.531 | 55.745 | 57.771 |
| | Image-side surface 66 | 2.214 | 0.663 | | | |
| Seventh lens element 7 | Object-side surface 75 | -2.464 | 0.230 | 1.642 | 22.409 | -3.073 |
| | Image-side surface 76 | 10.702 | 0.150 | | | |
| Filter 9 | Object-side surface 95 | Infinity | 0.510 | 1.523 | 54.512 | |
| | Image-side surface 96 | Infinity | 0.085 | | | |
| | Image plane 99 | Infinity | | | | |

FIG. 28

| Surface | K | $a_2$ | $a_4$ | $a_6$ | $a_8$ |
|---|---|---|---|---|---|
| 15 | 0.000000E+00 | 0.000000E+00 | 3.017266E-03 | 4.588369E-03 | -6.072025E-04 |
| 16 | 0.000000E+00 | 0.000000E+00 | -4.750227E-03 | 2.389091E-02 | -1.550437E-02 |
| 25 | -9.814690E+01 | 0.000000E+00 | -4.028840E-02 | 4.541293E-02 | -1.701569E-02 |
| 26 | -1.280225E+01 | 0.000000E+00 | -1.846752E-02 | 3.002434E-02 | -1.215148E-04 |
| 35 | 7.712983E+00 | 0.000000E+00 | -4.489636E-02 | 1.105769E-02 | -2.775913E-02 |
| 36 | -7.102731E+00 | 0.000000E+00 | -2.030635E-02 | -1.345106E-02 | -1.025926E-02 |
| 45 | 6.134056E+01 | 0.000000E+00 | -9.002019E-02 | -8.734990E-03 | 1.342174E-02 |
| 46 | -8.033318E-01 | 0.000000E+00 | -5.905124E-02 | -2.556280E-02 | 5.808658E-03 |
| 55 | -7.076798E+01 | 0.000000E+00 | 4.437439E-02 | -4.800453E-02 | 8.903039E-03 |
| 56 | -2.415572E+00 | 0.000000E+00 | -1.480382E-03 | -1.572572E-04 | 8.719193E-04 |
| 65 | -4.672744E+00 | 0.000000E+00 | -7.746068E-02 | -8.393447E-04 | 1.178130E-03 |
| 66 | -4.166451E-01 | 0.000000E+00 | -1.121972E-01 | 1.237826E-02 | -7.354844E-04 |
| 75 | -4.853997E-01 | 0.000000E+00 | 2.302711E-02 | -4.697958E-04 | -1.142956E-04 |
| 76 | -6.271607E+01 | 0.000000E+00 | -8.981573E-03 | 2.038770E-03 | -2.703181E-04 |
| Surface | $a_{10}$ | $a_{12}$ | $a_{14}$ | $a_{16}$ | |
| 15 | -1.337021E-03 | 6.824782E-04 | 7.354759E-04 | -3.368882E-04 | |
| 16 | 1.462880E-03 | 2.375642E-03 | 3.598245E-04 | -7.041137E-04 | |
| 25 | -2.843748E-03 | 3.937351E-03 | 8.659928E-04 | -1.159856E-03 | |
| 26 | -9.219172E-03 | 2.120590E-03 | 4.471722E-03 | -1.708054E-03 | |
| 35 | 7.650941E-03 | 3.781996E-03 | -1.772840E-03 | -1.287230E-04 | |
| 36 | 7.729143E-04 | 1.764554E-04 | -9.238945E-04 | 2.599156E-04 | |
| 45 | -8.812600E-03 | -4.179522E-03 | 2.588393E-03 | 3.461031E-04 | |
| 46 | 2.230641E-03 | -6.288551E-04 | -6.134785E-04 | 3.228580E-04 | |
| 55 | 8.846969E-04 | -5.359721E-04 | -1.478740E-04 | 1.427935E-05 | |
| 56 | 6.750857E-06 | -2.579852E-05 | -8.674249E-06 | 1.442972E-06 | |
| 65 | 2.178599E-04 | -4.316710E-06 | -1.044252E-05 | 9.014774E-07 | |
| 66 | -8.302592E-06 | 6.184289E-06 | -6.875753E-07 | 2.061857E-08 | |
| 75 | 1.813699E-05 | 5.877053E-07 | -2.658743E-07 | 1.527444E-08 | |
| 76 | 1.680331E-06 | 9.875769E-07 | 4.608313E-08 | -5.553188E-09 | |

FIG. 29

| Seventh embodiment | | | | | | |
|---|---|---|---|---|---|---|
| System length= 5.226 mm, Effective focal length=3.626 mm, Half field of view=39.720°, Image height=3.500 mm, F-number=1.616 | | | | | | |
| Element | Surface | Radius (mm) | Thickness (mm) | Refractive index | Abbe number | Focal length (mm) |
| Object | | Infinity | Infinity | | | |
| Aperture 0 | | Infinity | -0.350 | | | |
| First lens element 1 | Object-side surface 15 | 2.031 | 0.654 | 1.545 | 55.987 | 3.919 |
| | Image-side surface 16 | 35.105 | 0.121 | | | |
| Second lens element 2 | Object-side surface 25 | 5.451 | 0.215 | 1.642 | 22.409 | -7.932 |
| | Image-side surface 26 | 2.603 | 0.353 | | | |
| Third lens element 3 | Object-side surface 35 | 5.596 | 0.536 | 1.545 | 55.987 | 11.061 |
| | Image-side surface 36 | 73.131 | 0.266 | | | |
| Fourth lens element 4 | Object-side surface 45 | -10.968 | 0.296 | 1.642 | 22.409 | -16.425 |
| | Image-side surface 46 | 350.942 | 0.258 | | | |
| Fifth lens element 5 | Object-side surface 55 | -6.249 | 0.563 | 1.642 | 22.409 | 3.960 |
| | Image-side surface 56 | -1.882 | 0.020 | | | |
| Sixth lens element 6 | Object-side surface 65 | 2.226 | 0.361 | 1.545 | 55.987 | 128.737 |
| | Image-side surface 66 | 2.167 | 0.627 | | | |
| Seventh lens element 7 | Object-side surface 75 | -2.423 | 0.207 | 1.531 | 55.745 | -3.951 |
| | Image-side surface 76 | 16.566 | 0.150 | | | |
| Filter 9 | Object-side surface 95 | Infinity | 0.510 | 1.523 | 54.512 | |
| | Image-side surface 96 | Infinity | 0.088 | | | |
| | Image plane 99 | Infinity | | | | |

FIG. 32

| Surface | K | $a_2$ | $a_4$ | $a_6$ | $a_8$ |
|---|---|---|---|---|---|
| 15 | 0.000000E+00 | 0.000000E+00 | 3.151259E-03 | 4.664442E-03 | -5.708098E-04 |
| 16 | 0.000000E+00 | 0.000000E+00 | -4.836680E-03 | 2.383621E-02 | -1.548064E-02 |
| 25 | -9.814690E+01 | 0.000000E+00 | -3.903103E-02 | 4.491356E-02 | -1.710344E-02 |
| 26 | -1.280225E+01 | 0.000000E+00 | -1.813586E-02 | 3.065017E-02 | -2.027181E-04 |
| 35 | 7.712983E+00 | 0.000000E+00 | -4.600804E-02 | 1.020059E-02 | -2.727447E-02 |
| 36 | -7.102731E+00 | 0.000000E+00 | -1.887714E-02 | -1.323466E-02 | -1.013781E-02 |
| 45 | 6.134056E+01 | 0.000000E+00 | -8.827577E-02 | -8.704881E-03 | 1.349748E-02 |
| 46 | -8.033318E-01 | 0.000000E+00 | -5.964132E-02 | -2.588365E-02 | 5.751797E-03 |
| 55 | -7.076798E+01 | 0.000000E+00 | 4.276147E-02 | -4.654375E-02 | 9.304251E-03 |
| 56 | -2.415572E+00 | 0.000000E+00 | -2.736497E-03 | -1.950702E-04 | 8.777281E-04 |
| 65 | -4.672744E+00 | 0.000000E+00 | -7.550596E-02 | -1.144341E-03 | 1.192502E-03 |
| 66 | -4.166451E-01 | 0.000000E+00 | -1.085756E-01 | 1.255550E-02 | -7.341613E-04 |
| 75 | -4.853997E-01 | 0.000000E+00 | 2.420218E-02 | -3.875980E-04 | -1.040965E-04 |
| 76 | -6.271607E+01 | 0.000000E+00 | -8.840488E-03 | 1.985434E-03 | -2.788869E-04 |
| Surface | $a_{10}$ | $a_{12}$ | $a_{14}$ | $a_{16}$ | |
| 15 | -1.305007E-03 | 7.119477E-04 | 7.684436E-04 | -3.191982E-04 | |
| 16 | 1.486410E-03 | 2.411678E-03 | 3.978542E-04 | -6.657118E-04 | |
| 25 | -2.912113E-03 | 3.897007E-03 | 8.401748E-04 | -1.166853E-03 | |
| 26 | -9.247827E-03 | 2.074317E-03 | 4.440181E-03 | -1.740113E-03 | |
| 35 | 7.533105E-03 | 3.748084E-03 | -1.778828E-03 | -1.210795E-04 | |
| 36 | 8.235829E-04 | 1.949476E-04 | -9.185637E-04 | 2.618448E-04 | |
| 45 | -8.521349E-03 | -4.108743E-03 | 2.591117E-03 | 3.457867E-04 | |
| 46 | 2.216549E-03 | -6.325326E-04 | -6.155660E-04 | 3.222391E-04 | |
| 55 | 1.003266E-03 | -5.055475E-04 | -1.412450E-04 | 1.457582E-05 | |
| 56 | 1.032049E-05 | -2.466655E-05 | -8.355267E-06 | 1.520573E-06 | |
| 65 | 2.202890E-04 | -3.826239E-06 | -1.011280E-05 | 9.008773E-07 | |
| 66 | -9.068234E-06 | 6.137959E-06 | -6.948750E-07 | 1.980641E-08 | |
| 75 | 1.874148E-05 | 6.098696E-07 | -2.625557E-07 | 1.528686E-08 | |
| 76 | 1.186197E-06 | 9.800557E-07 | 4.755765E-08 | -5.306198E-09 | |

FIG. 33

| Eighth embodiment | | | | | | |
|---|---|---|---|---|---|---|
| System length= 5.393 mm, Effective focal length=4.029 mm, Half field of view=38.801°, Image height=3.500 mm, F-number=1.603 | | | | | | |
| Element | Surface | Radius (mm) | Thickness (mm) | Refractive index | Abbe number | Focal length (mm) |
| Object | | Infinity | Infinity | | | |
| Aperture 0 | | Infinity | -0.463 | | | |
| First lens element 1 | Object-side surface 15 | 2.035 | 0.671 | 1.545 | 55.987 | 3.928 |
| | Image-side surface 16 | 34.768 | 0.126 | | | |
| Second lens element 2 | Object-side surface 25 | 5.812 | 0.221 | 1.642 | 22.409 | -7.487 |
| | Image-side surface 26 | 2.603 | 0.362 | | | |
| Third lens element 3 | Object-side surface 35 | 5.679 | 0.534 | 1.545 | 55.987 | 11.258 |
| | Image-side surface 36 | 71.680 | 0.279 | | | |
| Fourth lens element 4 | Object-side surface 45 | -11.137 | 0.302 | 1.642 | 22.409 | -17.359 |
| | Image-side surface 46 | -1268.188 | 0.266 | | | |
| Fifth lens element 5 | Object-side surface 55 | -4.815 | 0.563 | 1.545 | 55.987 | 4.561 |
| | Image-side surface 56 | -1.710 | 0.020 | | | |
| Sixth lens element 6 | Object-side surface 65 | 2.200 | 0.364 | 1.661 | 20.373 | 45.892 |
| | Image-side surface 66 | 2.213 | 0.613 | | | |
| Seventh lens element 7 | Object-side surface 75 | -2.447 | 0.206 | 1.531 | 55.745 | -3.365 |
| | Image-side surface 76 | 6.910 | 0.200 | | | |
| Filter 9 | Object-side surface 95 | Infinity | 0.510 | 1.523 | 54.512 | |
| | Image-side surface 96 | Infinity | 0.157 | | | |
| | Image plane 99 | Infinity | | | | |

FIG. 36

| Surface | K | a2 | a4 | a6 | a8 |
|---|---|---|---|---|---|
| 15 | 0.000000E+00 | 0.000000E+00 | 2.968737E-03 | 4.538164E-03 | -5.944986E-04 |
| 16 | 0.000000E+00 | 0.000000E+00 | -4.737599E-03 | 2.387037E-02 | -1.550256E-02 |
| 25 | -9.814690E+01 | 0.000000E+00 | -4.054081E-02 | 4.542851E-02 | -1.698888E-02 |
| 26 | -1.280225E+01 | 0.000000E+00 | -1.788012E-02 | 2.987356E-02 | -2.461006E-04 |
| 35 | 7.712983E+00 | 0.000000E+00 | -4.546041E-02 | 1.053898E-02 | -2.788445E-02 |
| 36 | -7.102731E+00 | 0.000000E+00 | -2.080036E-02 | -1.348152E-02 | -1.017555E-02 |
| 45 | 6.134056E+01 | 0.000000E+00 | -8.942284E-02 | -8.688288E-03 | 1.339313E-02 |
| 46 | -8.033318E-01 | 0.000000E+00 | -5.996699E-02 | -2.576282E-02 | 5.743591E-03 |
| 55 | -7.076798E+01 | 0.000000E+00 | 4.334774E-02 | -4.801230E-02 | 8.984709E-03 |
| 56 | -2.415572E+00 | 0.000000E+00 | -2.725091E-03 | 2.472460E-04 | 9.149117E-04 |
| 65 | -4.672744E+00 | 0.000000E+00 | -7.866531E-02 | -1.052680E-03 | 1.182217E-03 |
| 66 | -4.166451E-01 | 0.000000E+00 | -1.095294E-01 | 1.255903E-02 | -7.371587E-04 |
| 75 | -4.853997E-01 | 0.000000E+00 | 2.436346E-02 | -3.569333E-04 | -1.069600E-04 |
| 76 | -6.271607E+01 | 0.000000E+00 | -1.097971E-02 | 2.049857E-03 | -2.775700E-04 |
| Surface | a10 | a12 | a14 | a16 | |
| 15 | -1.323437E-03 | 6.888758E-04 | 7.374865E-04 | -3.371466E-04 | |
| 16 | 1.474485E-03 | 2.384531E-03 | 3.598388E-04 | -7.085712E-04 | |
| 25 | -2.830948E-03 | 3.944276E-03 | 8.676410E-04 | -1.157356E-03 | |
| 26 | -9.245023E-03 | 2.133903E-03 | 4.494958E-03 | -1.693462E-03 | |
| 35 | 7.617888E-03 | 3.763246E-03 | -1.793638E-03 | -1.474022E-04 | |
| 36 | 8.282976E-04 | 2.044225E-04 | -9.101156E-04 | 2.668345E-04 | |
| 45 | -8.816584E-03 | -4.174896E-03 | 2.592632E-03 | 3.482090E-04 | |
| 46 | 2.198284E-03 | -6.421470E-04 | -6.182095E-04 | 3.216008E-04 | |
| 55 | 9.547244E-04 | -5.098799E-04 | -1.448354E-04 | 1.185555E-05 | |
| 56 | 8.681331E-06 | -2.583382E-05 | -8.764165E-06 | 1.384981E-06 | |
| 65 | 2.197583E-04 | -4.096305E-06 | -1.043324E-05 | 8.975827E-07 | |
| 66 | -9.186023E-06 | 6.077297E-06 | -6.981282E-07 | 1.982443E-08 | |
| 75 | 1.857654E-05 | 6.074852E-07 | -2.659571E-07 | 1.502384E-08 | |
| 76 | 1.262995E-06 | 9.868413E-07 | 4.877403E-08 | -5.107287E-09 | |

FIG. 37

| Condition | First embodiment | Second embodiment | Third embodiment | Fourth embodiment |
|---|---|---|---|---|
| T1 | 0.656 | 0.656 | 0.643 | 0.660 |
| G12 | 0.122 | 0.141 | 0.166 | 0.129 |
| T2 | 0.219 | 0.220 | 0.215 | 0.216 |
| G23 | 0.369 | 0.370 | 0.333 | 0.338 |
| T3 | 0.498 | 0.533 | 0.538 | 0.557 |
| G34 | 0.283 | 0.265 | 0.286 | 0.268 |
| T4 | 0.311 | 0.338 | 0.310 | 0.298 |
| G45 | 0.269 | 0.258 | 0.257 | 0.263 |
| T5 | 0.456 | 0.538 | 0.532 | 0.617 |
| G56 | 0.061 | 0.099 | 0.100 | 0.020 |
| T6 | 0.348 | 0.375 | 0.359 | 0.382 |
| G67 | 0.602 | 0.539 | 0.544 | 0.590 |
| T7 | 0.335 | 0.168 | 0.347 | 0.258 |
| G7F | 0.200 | 0.200 | 0.160 | 0.284 |
| TF | 0.510 | 0.510 | 0.510 | 0.510 |
| GFP | 0.095 | 0.193 | 0.132 | -0.007 |
| V1 | 55.987 | 55.987 | 55.987 | 55.987 |
| V2 | 22.409 | 22.409 | 22.409 | 22.409 |
| V3 | 55.987 | 55.987 | 55.987 | 55.987 |
| V4 | 22.409 | 22.409 | 22.409 | 22.409 |
| V5 | 55.987 | 55.987 | 55.987 | 55.987 |
| V6 | 22.409 | 22.409 | 22.409 | 22.409 |
| V7 | 55.745 | 55.745 | 55.745 | 55.745 |
| EFL | 3.919 | 3.994 | 3.932 | 3.915 |
| TL | 4.528 | 4.499 | 4.629 | 4.596 |
| BFL | 0.805 | 0.903 | 0.802 | 0.787 |
| ALT | 2.823 | 2.827 | 2.943 | 2.989 |
| AAG | 1.705 | 1.672 | 1.686 | 1.608 |
| TTL | 5.333 | 5.402 | 5.431 | 5.384 |
| HFOV | 39.164 | 37.451 | 38.403 | 38.801 |

FIG. 38

| Condition | First embodiment | Second embodiment | Third embodiment | Fourth embodiment |
|---|---|---|---|---|
| V5+V6+V7 | 134.141 | 134.141 | 134.141 | 134.141 |
| (G67+G23) / (T6+T4) | 1.471 | 1.276 | 1.312 | 1.364 |
| AAG / (G12+G56) | 9.328 | 6.973 | 6.332 | 10.801 |
| (G23+G67) / T4 | 3.116 | 2.694 | 2.833 | 3.116 |
| (T1+T3+T5) / G67 | 2.675 | 3.200 | 3.149 | 3.111 |
| ALT / (G23+T4) | 4.150 | 3.994 | 4.579 | 4.700 |
| (T2+T4+T6+T7) / T3 | 2.437 | 2.068 | 2.288 | 2.070 |
| AAG / T1 | 2.600 | 2.550 | 2.623 | 2.435 |
| (T1+T6) / T5 | 2.200 | 1.918 | 1.883 | 1.689 |
| (T6+T7) / T2 | 3.124 | 2.465 | 3.290 | 2.970 |
| ALT / (G12+G34+G45) | 4.190 | 4.260 | 4.151 | 4.528 |
| BFL / (G12+G56) | 4.406 | 3.768 | 3.014 | 5.288 |
| TTL / (G23+G67) | 5.495 | 5.940 | 6.193 | 5.802 |
| TTL / (T3+T5) | 5.589 | 5.049 | 5.077 | 4.583 |
| ALT / (G67+T7) | 3.014 | 3.998 | 3.302 | 3.526 |
| TL / (T4+T7) | 7.005 | 8.900 | 7.048 | 8.273 |
| AAG / G67 | 2.833 | 3.100 | 3.100 | 2.726 |
| BFL / T5 | 1.765 | 1.680 | 1.508 | 1.275 |
| EFL / (T6+T7) | 5.738 | 7.352 | 5.568 | 6.114 |
| EFL / (G12+G34+G45) | 5.816 | 6.018 | 5.546 | 5.932 |

FIG. 39

| Condition | Fifth embodiment | Sixth embodiment | Seventh embodiment | Eighth embodiment |
|---|---|---|---|---|
| T1 | 0.565 | 0.658 | 0.654 | 0.671 |
| G12 | 0.117 | 0.124 | 0.121 | 0.126 |
| T2 | 0.204 | 0.215 | 0.215 | 0.221 |
| G23 | 0.385 | 0.346 | 0.353 | 0.362 |
| T3 | 0.531 | 0.543 | 0.536 | 0.534 |
| G34 | 0.319 | 0.275 | 0.266 | 0.279 |
| T4 | 0.297 | 0.292 | 0.296 | 0.302 |
| G45 | 0.257 | 0.240 | 0.258 | 0.266 |
| T5 | 0.461 | 0.602 | 0.563 | 0.563 |
| G56 | 0.101 | 0.020 | 0.020 | 0.020 |
| T6 | 0.340 | 0.363 | 0.361 | 0.364 |
| G67 | 0.627 | 0.663 | 0.627 | 0.613 |
| T7 | 0.199 | 0.230 | 0.207 | 0.206 |
| G7F | 0.284 | 0.150 | 0.150 | 0.200 |
| TF | 0.510 | 0.510 | 0.510 | 0.510 |
| GFP | 0.057 | 0.085 | 0.088 | 0.157 |
| V1 | 55.987 | 55.987 | 55.987 | 55.987 |
| V2 | 22.409 | 22.409 | 22.409 | 22.409 |
| V3 | 55.987 | 55.987 | 55.987 | 55.987 |
| V4 | 22.409 | 22.409 | 22.409 | 22.409 |
| V5 | 55.987 | 55.987 | 22.409 | 55.987 |
| V6 | 22.409 | 55.745 | 55.987 | 20.373 |
| V7 | 55.745 | 22.409 | 55.745 | 55.745 |
| EFL | 3.860 | 3.852 | 3.626 | 4.029 |
| TL | 4.403 | 4.571 | 4.478 | 4.526 |
| BFL | 0.851 | 0.745 | 0.748 | 0.867 |
| ALT | 2.596 | 2.903 | 2.833 | 2.862 |
| AAG | 1.807 | 1.668 | 1.645 | 1.665 |
| TTL | 5.254 | 5.316 | 5.226 | 5.393 |
| HFOV | 39.868 | 39.100 | 39.720 | 38.801 |

FIG. 40

| Condition | Fifth embodiment | Sixth embodiment | Seventh embodiment | Eighth embodiment |
|---|---|---|---|---|
| V5+V6+V7 | 134.141 | 134.141 | 134.141 | 132.105 |
| (G67+G23) / (T6+T4) | 1.589 | 1.539 | 1.492 | 1.462 |
| AAG / (G12+G56) | 8.280 | 11.607 | 11.713 | 11.418 |
| (G23+G67) / T4 | 3.410 | 3.453 | 3.311 | 3.225 |
| (T1+T3+T5) / G67 | 2.483 | 2.720 | 2.797 | 2.886 |
| ALT / (G23+T4) | 3.805 | 4.546 | 4.365 | 4.308 |
| (T2+T4+T6+T7) / T3 | 1.958 | 2.028 | 2.012 | 2.049 |
| AAG / T1 | 3.200 | 2.534 | 2.514 | 2.479 |
| (T1+T6) / T5 | 1.962 | 1.698 | 1.803 | 1.840 |
| (T6+T7) / T2 | 2.644 | 2.752 | 2.638 | 2.588 |
| ALT / (G12+G34+G45) | 3.743 | 4.545 | 4.392 | 4.272 |
| BFL / (G12+G56) | 3.900 | 5.185 | 5.327 | 5.944 |
| TTL / (G23+G67) | 5.189 | 5.268 | 5.332 | 5.533 |
| TTL / (T3+T5) | 5.296 | 4.646 | 4.754 | 4.918 |
| ALT / (G67+T7) | 3.145 | 3.253 | 3.396 | 3.494 |
| TL / (T4+T7) | 8.886 | 8.758 | 8.900 | 8.900 |
| AAG / G67 | 2.881 | 2.517 | 2.623 | 2.717 |
| BFL / T5 | 1.845 | 1.238 | 1.329 | 1.539 |
| EFL / (T6+T7) | 7.163 | 6.495 | 6.385 | 7.058 |
| EFL / (G12+G34+G45) | 5.565 | 6.031 | 5.622 | 6.014 |

FIG. 41

OPTICAL IMAGING LENS

CROSS-REFERENCE TO RELATED APPLICATION

This application claims the priority benefit of Chinese application serial no. 201711474937.2, filed on Dec. 29, 2017. The entirety of the above-mentioned patent application is hereby incorporated by reference herein and made a part of this specification.

BACKGROUND OF THE INVENTION

1. Field of the Invention

The invention relates to an optical device, and particularly relates to an optical imaging lens.

2. Description of Related Art

New models of consumer electronic products with new specifications emerge one after another, and the market has been keenly pursuing a lighter, thinner, compacter, and smaller device. Thus, the specifications of critical parts of electronic products, such as optical lenses, need to be constantly refined to meet the consumers' demands. The imaging quality and size are two main properties of optical lenses. Additionally, increasing the field of view and expanding the aperture become more and more important. Regarding the imaging quality, as image sensing technologies advance, the consumer's demands also become higher. Thus, in addition to miniaturization of lenses, the imaging quality and performance of lenses also draw attention in the field of optical lens design.

However, when designing an optical lens, an optical lens having both a miniaturized size and a desirable imaging quality cannot be simply manufactured by scaling down a lens with a desirable imaging quality. The design not only involves material properties but also needs to take practical production issues, such as manufacturing and assembling yield rates, into consideration. Particularly, the technical level of a miniaturized lens is higher than that of a traditional lens. Therefore, how to manufacture an optical lens meeting the needs of consumer electronic products and facilitate the imaging quality of such optical lens has been an issue of this field.

SUMMARY OF THE INVENTION

One or some exemplary embodiments of the invention provide an optical imaging lens having a desirable optical performance and a greater field of view.

An embodiment of the invention provides an optical imaging lens including a first lens element, a second lens element, a third lens element, a fourth lens element, a fifth lens element, a sixth lens element, and a seventh lens element along an optical axis from an object side to an image side in sequence. Each of the lens elements has an object-side surface facing toward the object side and allowing imaging rays to pass through and an image-side surface facing toward the image side and allowing the imaging rays to pass through. The seven lens elements described above being the only lens elements having refracting power in the optical imaging lens. The first lens element has positive refracting power, and a periphery region of the image-side surface of the first lens element is concave. An optical axis region of the image-side surface of the second lens element is concave. A periphery region of the object-side surface of the third lens element is concave. An optical axis region of the image-side surface of the sixth lens element is concave. The optical imaging lens satisfies conditions as follows: $V5+V6+V7 \leq 150.000$ and $(G67+G23)/(T6+T4) \geq 1.200$, wherein V5 is an Abbe number of the fifth lens element, V6 is an Abbe number of the sixth lens element, V7 is an Abbe number of the seventh lens element, G67 is an air gap on the optical axis from the sixth lens element to the seventh lens element, G23 is an air gap on the optical axis from the second lens element to the third lens element, T6 is a central thickness of the sixth lens element on the optical axis, and T4 is a central thickness of the fourth lens element on the optical axis.

Another embodiment of the invention provides an optical imaging lens including a first lens element, a second lens element, a third lens element, a fourth lens element, a fifth lens element, a sixth lens element, and a seventh lens element along an optical axis from an object side to an image side in sequence. Each of the lens elements has an object-side surface facing toward the object side and allowing imaging rays to pass through and an image-side surface facing toward the image side and allowing the imaging rays to pass through. The seven lens elements described above being the only lens elements having refracting power in the optical imaging lens. The first lens element has positive refracting power, and a periphery region of the image-side surface of the first lens element is concave. A periphery region of the object-side surface of the third lens element is concave. A periphery region of the object-side surface of the fourth lens element is concave. An optical axis region of the image-side surface of the sixth lens element is concave. The optical imaging lens satisfies conditions as follows: $V5+V6+V7 \leq 150.000$ and $(G67+G23)/(T6+T4) \geq 1.200$, wherein V5 is an Abbe number of the fifth lens element, V6 is an Abbe number of the sixth lens element, V7 is an Abbe number of the seventh lens element, G67 is an air gap on the optical axis from the sixth lens element to the seventh lens element, G23 is an air gap on the optical axis from the second lens element to the third lens element, T6 is a central thickness of the sixth lens element on the optical axis, and T4 is a central thickness of the fourth lens element on the optical axis.

Based on the above, the optical imaging lens according to the embodiments of the invention is effective in terms of the following. By controlling the design of the concave and convex surfaces of the respective lens elements and satisfying the conditions of $V5+V6+V7 \leq 150.000$ and $(G67+G23)/(T6+T4) \geq 1.200$, the optical imaging lens according to the embodiments of the invention is able to render a desirable optical performance and expanding the field of view.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic diagram illustrating a surface shape structure of a lens element according to Example 1.

FIG. 4 is a schematic diagram illustrating a surface shape structure of a lens element according to Example 2.

FIG. 5 is a schematic diagram illustrating a surface shape structure of a lens element according to Example 3.

FIG. 6 is a schematic diagram illustrating an optical imaging lens according to a first embodiment of the invention.

FIGS. 7A to 7D are diagrams illustrating a longitudinal spherical aberration and various aberrations of the optical imaging lens according to the first embodiment.

FIG. 8 shows detailed optical data of the optical imaging lens according to the first embodiment of the invention.

FIG. 9 shows aspheric parameters pertaining to the optical imaging lens according to the first embodiment of the invention.

FIG. 12 shows detailed optical data of the optical imaging lens according to the second embodiment of the invention.

FIG. 13 shows aspheric parameters pertaining to the optical imaging lens according to the second embodiment of the invention.

FIG. 16 shows detailed optical data of the optical imaging lens according to the third embodiment of the invention.

FIG. 17 shows aspheric parameters pertaining to the optical imaging lens according to the third embodiment of the invention.

FIG. 20 shows detailed optical data of the optical imaging lens according to the fourth embodiment of the invention.

FIG. 21 shows aspheric parameters pertaining to the optical imaging lens according to the fourth embodiment of the invention.

FIG. 24 shows detailed optical data of the optical imaging lens according to the fifth embodiment of the invention.

FIG. 25 shows aspheric parameters pertaining to the optical imaging lens according to the fifth embodiment of the invention.

FIG. 28 shows detailed optical data of the optical imaging lens according to the sixth embodiment of the invention.

FIG. 29 shows aspheric parameters pertaining to the optical imaging lens according to the sixth embodiment of the invention.

FIG. 32 shows detailed optical data of the optical imaging lens according to the seventh embodiment of the invention.

FIG. 33 shows aspheric parameters pertaining to the optical imaging lens according to the seventh embodiment of the invention.

FIG. 36 shows detailed optical data of the optical imaging lens according to the eighth embodiment of the invention.

FIG. 37 shows aspheric parameters pertaining to the optical imaging lens according to the eighth embodiment of the invention.

FIGS. 38 and 39 shows values of respective important parameters and relations thereof of the optical imaging lenses according to the first to fourth embodiments of the invention.

FIGS. 40 and 41 shows values of respective important parameters and relations thereof of the optical imaging lenses according to the fifth to eighth embodiments of the invention.

DESCRIPTION OF THE EMBODIMENTS

Figure 1:
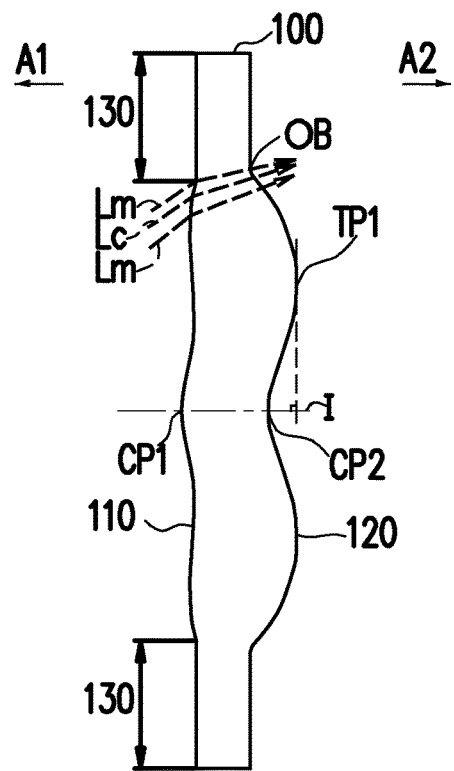
FIG. 1 is a schematic diagram illustrating a surface shape structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
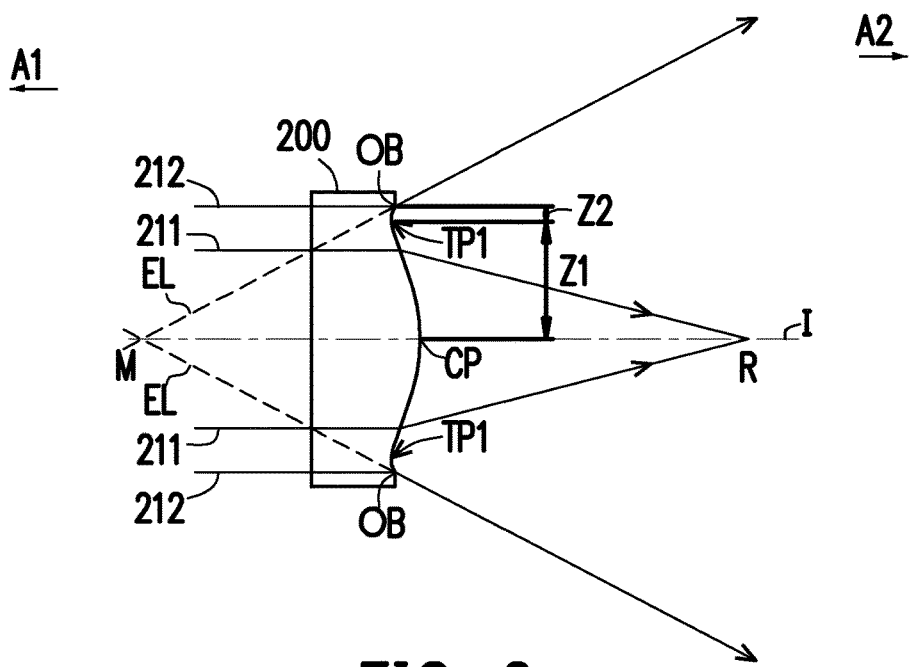
FIG. 2 is a schematic diagram illustrating surface shape concave and convex structures and a light focal point of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave.

In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic diagram illustrating an optical imaging lens according to a first embodiment of the invention, and FIGS. 7A to 7D are diagrams illustrating a longitudinal spherical aberration and various aberrations of the optical imaging lens according to the first embodiment. Referring to FIG. 6, from an object side A1 to an image side A2 along an optical axis I of an optical imaging lens 10 according to the first embodiment of the invention, the optical imaging lens 10 sequentially includes an aperture 0, a first lens element 1, a second lens element 2, a third lens element 3, a fourth lens element 4, a fifth lens element 5, a sixth lens element 6, a seventh lens element 7, and an IR cut filter 9. When rays emitted from an object to be shot enter the optical imaging lens 10, an image may be formed on an image plane 99 after the rays sequentially pass through the aperture 0, the first lens element 1, the second lens element 2, the third lens element 3, the fourth lens element 4, the fifth lens element 5, the sixth lens element 6, the seventh lens element 7, and the IR cut filter 9. The IR cut filter 9 is disposed between the seventh lens element 7 and the image plane 99. In addition, the object side A1 is a side facing toward the object to be shot, whereas the image side A2 is a side facing toward the image plane 99.

In the embodiment, the first lens element 1, the second lens element 2, the third lens element 3, the fourth lens element 4, the fifth lens element 5, the sixth lens element 6, the seventh lens element 7, and the IR cut filter 9 of the optical imaging lens 10 respectively have object-side surfaces 15, 25, 35, 45, 55, 65, 75, and 95 facing toward the object side A1 and allowing imaging rays to pass through and image-side surfaces 16, 26, 36, 46, 56, 66, 76, and 96 facing toward the image side A2 and allowing the imaging rays to pass through. In the embodiment, the aperture 0 is disposed before the first lens element 1.

The first lens element 1 has positive refracting power. An optical axis region 151 of the object-side surface 15 of the first lens element 1 is convex, and a periphery region 153 thereof is convex. An optical axis region 162 of the image-side surface 16 of the first lens element 1 is concave, and a periphery region 164 thereof is concave. In the embodiment, the object-side surface 15 and the image-side surface 16 of the first lens element 1 are aspheric surfaces.

The second lens element 2 has negative refracting power. An optical axis region 251 of the object-side surface 25 of the second lens element 2 is convex, and a periphery region 253 thereof is convex. An optical axis region 262 of the image-side surface 26 of the second lens element 2 is concave, and a periphery region 264 thereof is concave. In the embodiment, the object-side surface 25 and the image-side surface 26 of the second lens element 2 are aspheric surfaces.

The third lens element 3 has positive refracting power. An optical axis region 351 of the object-side surface 35 of the third lens element 3 is convex, and a periphery region 354 thereof is concave. An optical axis region 362 of the image-side surface 36 of the third lens element 3 is concave, and a periphery region 363 thereof is convex. In the embodiment, the object-side surface 35 and the image-side surface 36 of the third lens element 3 are aspheric surfaces.

The fourth lens element 4 has negative refracting power. An optical axis region 452 of the object-side surface 45 of the fourth lens element 4 is concave, and a periphery region 454 thereof is concave. An optical axis region 462 of the image-side surface 46 of the fourth lens element 4 is concave, and a periphery region 463 thereof is convex. In the embodiment, the object-side surface 45 and the image-side surface 46 of the fourth lens element 4 are aspheric surfaces.

The fifth lens element 5 has positive refracting power. An optical axis region 552 of the object-side surface 55 of the fifth lens element 5 is concave, and a periphery region 554 thereof is concave. An optical axis region 561 of the image-side surface 56 of the fifth lens element 5 is convex, and a periphery region 563 thereof is convex. In the embodiment, the object-side surface 55 and the image-side surface 56 of the fifth lens element 5 are aspheric surfaces.

The sixth lens element 6 has positive refracting power. An optical axis region 651 of the object-side surface 65 of the sixth lens element 6 is convex, and a periphery region 654 thereof is concave. An optical axis region 662 of the image-side surface 66 of the sixth lens element 6 is concave, and a periphery region 663 thereof is convex. In the embodiment, the object-side surface 65 and the image-side surface 66 of the sixth lens element 6 are aspheric surfaces.

The seventh lens element 7 has negative refracting power. An optical axis region 752 of the object-side surface 75 of the seventh lens element 7 is concave, and a periphery region 754 thereof is concave. An optical axis region 762 of the image-side surface 76 of the seventh lens element 7 is concave, and a periphery region 763 thereof is convex. In the embodiment, the object-side surface 75 and the image-side surface 76 of the seventh lens element 7 are aspheric surfaces.

For a lighter weight, the first lens element 1 to the lens element 7 are made of a plastic material.

Other detailed optical data of the first embodiment are as shown in FIG. 8. In addition, the system length of the whole optical imaging lens 10 of the first embodiment is 5.333 mm, the effective focal length (EFL) of the optical imaging lens element 10 of the first embodiment is 3.919 mm, the half field of view (HFOV) thereof is 39.164°, the image height thereof is 3.500 mm, and the f-number (Fno) thereof is 1.622. The system length refers to a distance on the optical axis I from the object-side surface 15 of the first lens element 1 to the image plane 99.

Besides, in the embodiment, a total of 14 surfaces, i.e., the object-side surfaces 15, 25, 35, 45, 55, 65, and 75 and the image-side surfaces 16, 26, 36, 46, 56, 66, and 76 of the first lens element 1, the second lens element 2, the third lens element 3, the fourth lens element 4, the fifth lens element 5, the sixth lens element 6, and the seventh lens element 7, are all common even aspheric surfaces. The aspheric surfaces are defined based on the following equation:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad (1)$$

wherein:
Y: a distance from a point on an aspheric curve to the optical axis;
Z: a depth of the aspheric surface
(i.e., a perpendicular distance between the point on the aspheric surface that is spaced by the distance Y from the optical axis and a tangent plane tangent to a vertex of the aspheric surface on the optical axis);
R: a radius of curvature of the surface of the lens element;
K: a conic constant;
$a_{2i}$: a $2i^{th}$ aspheric coefficient.

Respective aspheric coefficients of the object-side surface 15 of the first lens element 1 to the image-side surface 76 of the seventh lens element 7 in Equation (1) are as shown in FIG. 9. For example, the row number 15 in FIG. 9 indicates that the values are aspheric coefficients of the object-side surface 15 of the first lens element 1. Other rows are arranged based on the same principle.

In addition, relations of important parameters in the optical imaging lens 10 according to the first embodiment are as shown in FIGS. 38 and 39.

Specifically,
V1 is an Abbe number of the first lens element 1;
V2 is an Abbe number of the second lens element 2;
V3 is an Abbe number of the third lens element 3;
V4 is an Abbe number of the fourth lens element 4;
V5 is an Abbe number of the fifth lens element 5;
V6 is an Abbe number of the sixth lens element 6;
V7 is an Abbe number of the seventh lens element 7;
T1 is a central thickness of the first lens element 1 on the optical axis I;
T2 is a central thickness of the second lens element 2 on the optical axis I;
T3 is a central thickness of the third lens element 3 on the optical axis I;
T4 is a central thickness of the fourth lens element 4 on the optical axis I;
T5 is a central thickness of the fifth lens element 5 on the optical axis I;
T6 is a central thickness of the sixth lens element 6 on the optical axis I;
T7 is a central thickness of the seventh lens element 7 on the optical axis I;
G12 is an air gap on the optical axis I from the first lens element 1 to the second lens element 2;
G23 is an air gap on the optical axis I from the second lens element 2 to the third lens element 3;
G34 is an air gap on the optical axis I from the third lens element 3 to the fourth lens element 4;
G45 is an air gap on the optical axis I from the fourth lens element 4 to the fifth lens element 5;
G56 is an air gap on the optical axis I from the fifth lens element 5 to the sixth lens element 6;
G67 is an air gap on the optical axis I from the sixth lens element 6 to the seventh lens element 7;
G7F is an air gap on the optical axis I from the seventh lens element 7 to the IR cut filter 9;
TF is a central thickness of the IR cut filter 9 on the optical axis I;
GFP is an air gap on the optical axis I from the IR cut filter 9 to the image plane 99;
AAG is a total of the six air gaps from the first lens element 1 to the seventh lens element 7;
ALT is a total of the central thicknesses of the first lens element 1 to the seventh lens element 7 on the optical axis I;
EFL is an effective focal length of the optical aging lens 10;
BFL is a distance on the optical axis I from the image-side surface 76 of the seventh lens element 7 to the image plane 99;
TTL is a distance on the optical axis I from the object-side surface 15 of the first lens element 1 to the image plane 99;
TL is a distance on the optical axis from the object-side surface 15 of the first lens element 1 to the image-side surface 76 of the seventh lens element 7; and
HFOV is a half field of view of the optical imaging lens 10.

In FIG. 38, the unit of parameters in the rows from T1 to GFP and from EFL to TTL is mm, and the unit of parameters in the row of HFOV is degree (°).

Referring to FIGS. 7A to 7D, FIG. 7A illustrates the longitudinal spherical aberration of the first embodiment when the pupil radius of the first embodiment is 1.2323 mm, FIGS. 7B and 7C respectively illustrate the field curvature aberration in the Sagittal direction and the field curvature aberration in the Tangential direction on the image plane 99 of the first embodiment when the wavelength of the first embodiment is 470 mm, 555 mm, and 650 mm, and FIG. 7D illustrates the distortion aberration on the image plane 99 of the first embodiment when the wavelength of the first embodiment is 470 mm, 555 mm, and 650 mm. In FIG. 7A illustrating the longitudinal spherical aberration of the first embodiment, the curves representing the respective wavelengths are close to each other and approach the center, indicating that off-axis rays in different heights at the respective wavelengths are concentrated in a vicinity of the imaging point. Based on extents of deviation of the curves for the respective wavelengths, imaging point deviations of the off-axis rays in different heights are controlled within a range of ±48 micrometers. Therefore, the spherical aberration of the same wavelength is reduced in the first embodiments, and the distances among the three representing wavelengths are also close, indicating that imaging positions of rays of different wavelengths are concentrated. Hence, chromatic aberration is also suppressed.

In FIGS. 7B and 7C illustrating the field curvature aberrations, focal distance variations of the three representing wavelengths in the whole field range fall within ±75 micrometers, indicating that the optical system of the first embodiment is able to effectively reduce aberration. In FIG. 7D illustrating the distortion aberration, the distortion aberration rate of the first embodiment is maintained within a range of ±9.0%, indicating that the distortion aberration of the first embodiment satisfies an imaging quality requirement of an optical system. Hence, compared with known optical lenses, the first embodiment is able to render a preferable imaging quality under a condition that the system length is reduced to about 5.333 mm.

Figure 10:
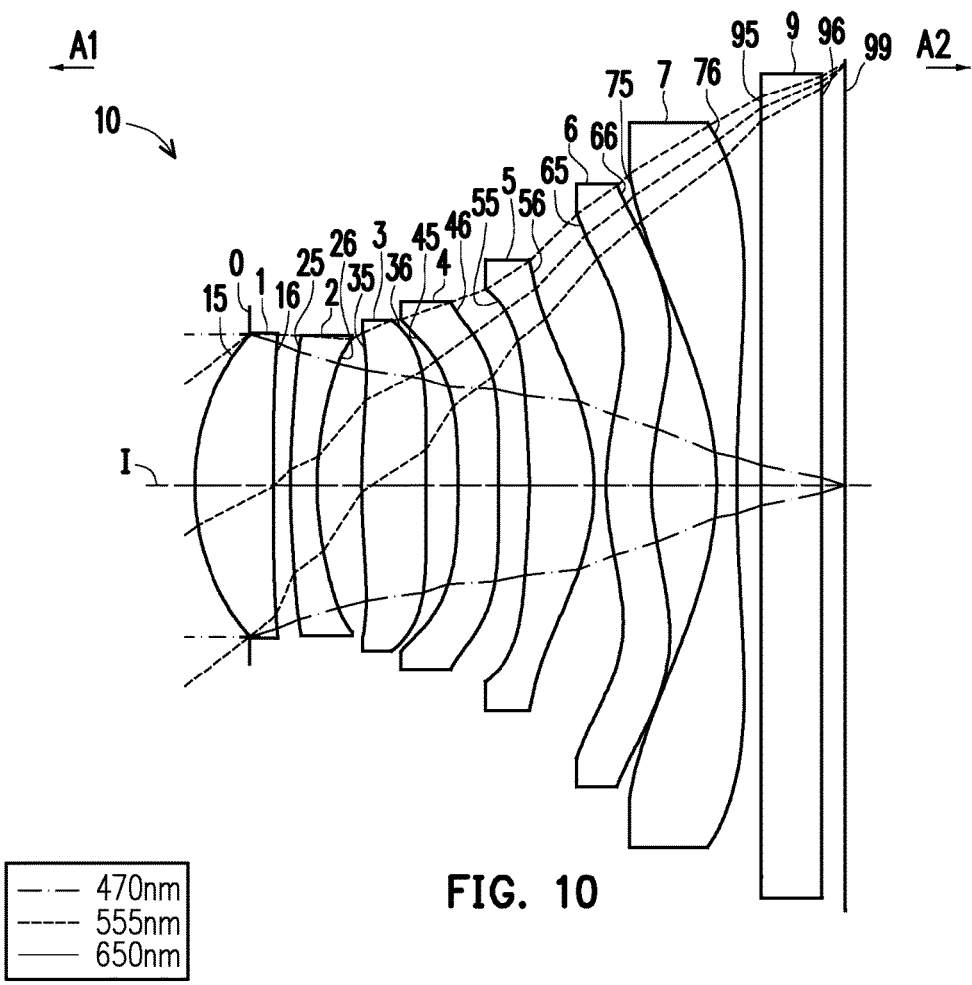
FIG. 10 is a schematic diagram illustrating an optical imaging lens according to a second embodiment of the invention.

FIG. 10 is a schematic diagram illustrating an optical imaging lens according to a second embodiment of the invention, and FIGS. 11A to 11D are diagrams illustrating a longitudinal spherical aberration and various aberrations of the optical imaging lens according to the second embodiment. Referring to FIG. 10, the second embodiment of the optical imaging lens 10 is similar to the first embodiment, and the differences therebetween mainly include the following: respective optical data, aspheric coefficients and parameters among the lens elements 1, 2, 3, 4, 5, 6, and 7 are different to a more or lesser extent. To clearly illustrate the drawing, some reference numerals indicating optical axis regions and periphery regions same as those in the first embodiment are omitted in FIG. 10.

Detailed optical data of the optical imaging lens 10 of the second embodiment are as shown in FIG. 12. In addition, the system length of the optical imaging lens 10 of the second embodiment is 5.402 mm, the EFL of the optical imaging lens element 10 of the second embodiment is 3.994 mm, the HFOV thereof is 37.451°, the image height thereof is 3.500 mm, and the Fno thereof is 1.616.

Respective aspheric coefficients of the object-side surface 15 of the first lens element 1 to the image-side surface 76 of the seventh lens element 7 of the second embodiment in Equation (1) are as shown in FIG. 13.

Figures 11A, 11B, 11C, 11D:
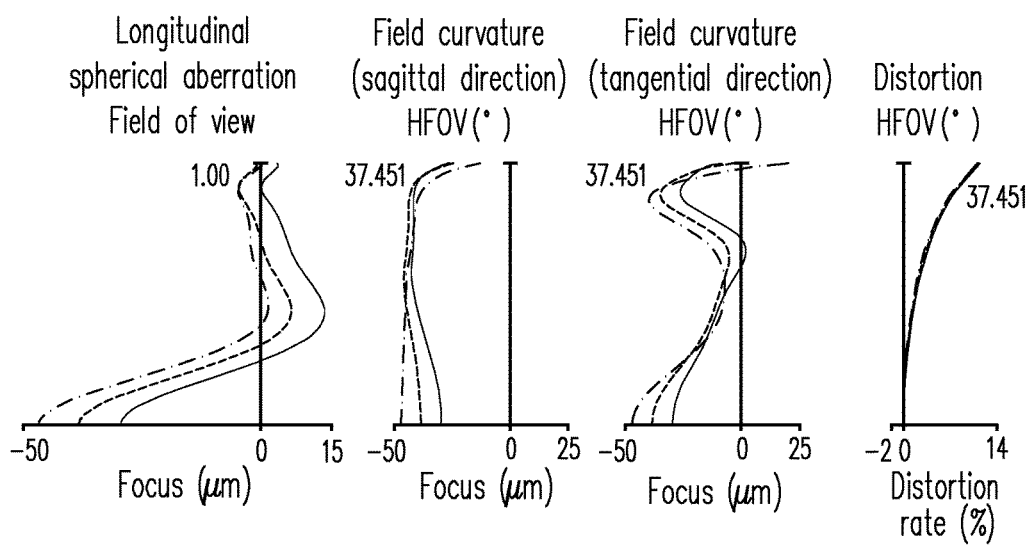
FIGS. 11A to 11D are diagrams illustrating a longitudinal spherical aberration and various aberrations of the optical imaging lens according to the second embodiment.

In addition, relations of important parameters in the optical imaging lens 10 according to the second embodiment are as shown in FIGS. 38 and 39. The longitudinal spherical aberration of the second embodiment when the pupil radius of the second embodiment is 1.2559 mm is shown in FIG. 11A, and imaging point deviations of the off-axis rays in different heights are controlled within a range of ±48 micrometers. In FIGS. 11B and 11C illustrating the field curvature aberrations, focal distance variations of the three representing wavelengths in the whole field range fall within ±50 micrometers. The distortion aberration shown in FIG. 11D indicates that the distortion aberration rate of the second embodiment is maintained within a range of ±14.0%. Hence, compared with the first embodiment, the second embodiment is easier to manufacture and therefore has a higher yield rate.

In addition, based on the above, the Fno of the second embodiment is smaller than that of the first embodiment, and the field curvature aberrations of the second embodiment are more desirable over those of the first embodiment.

Figure 14:
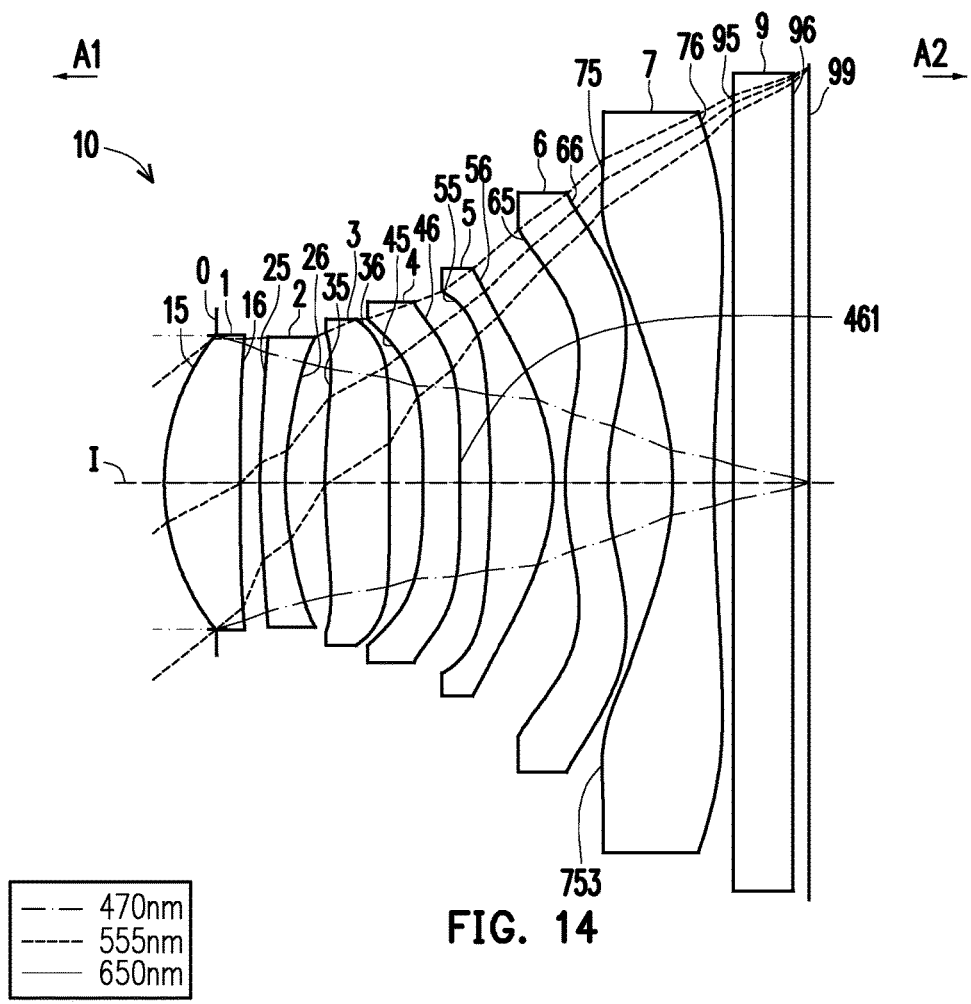
FIG. 14 is a schematic diagram illustrating an optical imaging lens according to a third embodiment of the invention.

FIG. 14 is a schematic diagram illustrating an optical imaging lens according to a third embodiment of the invention, and FIGS. 15A to 15D are diagrams illustrating a longitudinal spherical aberration and various aberrations of the optical imaging lens according to the third embodiment. Referring to FIG. 14, the third embodiment of the optical imaging lens 10 is similar to the first embodiment, and the differences therebetween mainly include the following: an optical axis region 461 of the image-side surface 46 of the fourth lens element 4 is convex, and a periphery region 753 of the object-side surface 75 of the seventh lens element 7 is convex in the third embodiment; and respective optical data, aspheric coefficients and parameters among the lens elements 1, 2, 3, 4, 5, 6, and 7 are different to a more or lesser extent. To clearly illustrate the drawing, some reference numerals indicating optical axis regions and periphery regions same as those in the first embodiment are omitted in FIG. 14.

Detailed optical data of the optical imaging lens 10 of the third embodiment are as shown in FIG. 16. In addition, the system length of the optical imaging lens 10 of the third embodiment is 5.431 mm, the EFL of the optical imaging lens element 10 of the third embodiment is 3.932 mm, the HFOV thereof is 38.403°, the image height thereof is 3.500 mm, and the Fno thereof is 1.639.

Respective aspheric coefficients of the object-side surface 15 of the first lens element 1 to the image-side surface 76 of the seventh lens element 7 of the third embodiment in Equation (1) are as shown in FIG. 17.

In addition, relations of important parameters in the optical imaging lens 10 according to the third embodiment are as shown in FIGS. 38 and 39.

Figures 15A, 15B, 15C, 15D:
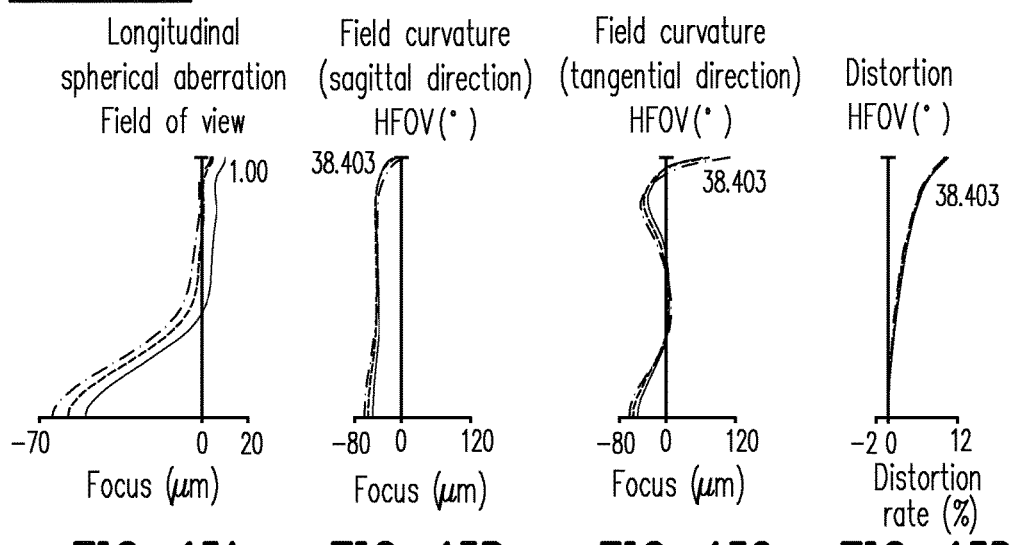
FIGS. 15A to 15D are diagrams illustrating a longitudinal spherical aberration and various aberrations of the optical imaging lens according to the third embodiment.

The longitudinal spherical aberration of the third embodiment when the pupil radius of the third embodiment is 1.2362 mm is shown in FIG. 15A, and imaging point deviations of the off-axis rays in different heights are controlled within a range of ±70 micrometers. In FIGS. 15B and 15C illustrating the field curvature aberrations, focal distance variations of the three representing wavelengths in the whole field range fall within ±70 micrometers. The distortion aberration shown in FIG. 15D indicates that the distortion aberration rate of the third embodiment is maintained within a range of ±12.0%. Hence, compared with the first embodiment, the third embodiment is easier to manufacture and therefore has a higher yield rate.

In addition, based on the above, the field curvature aberrations of the third embodiment are more desirable over the field curvature aberrations of the first embodiment.

Figure 18:
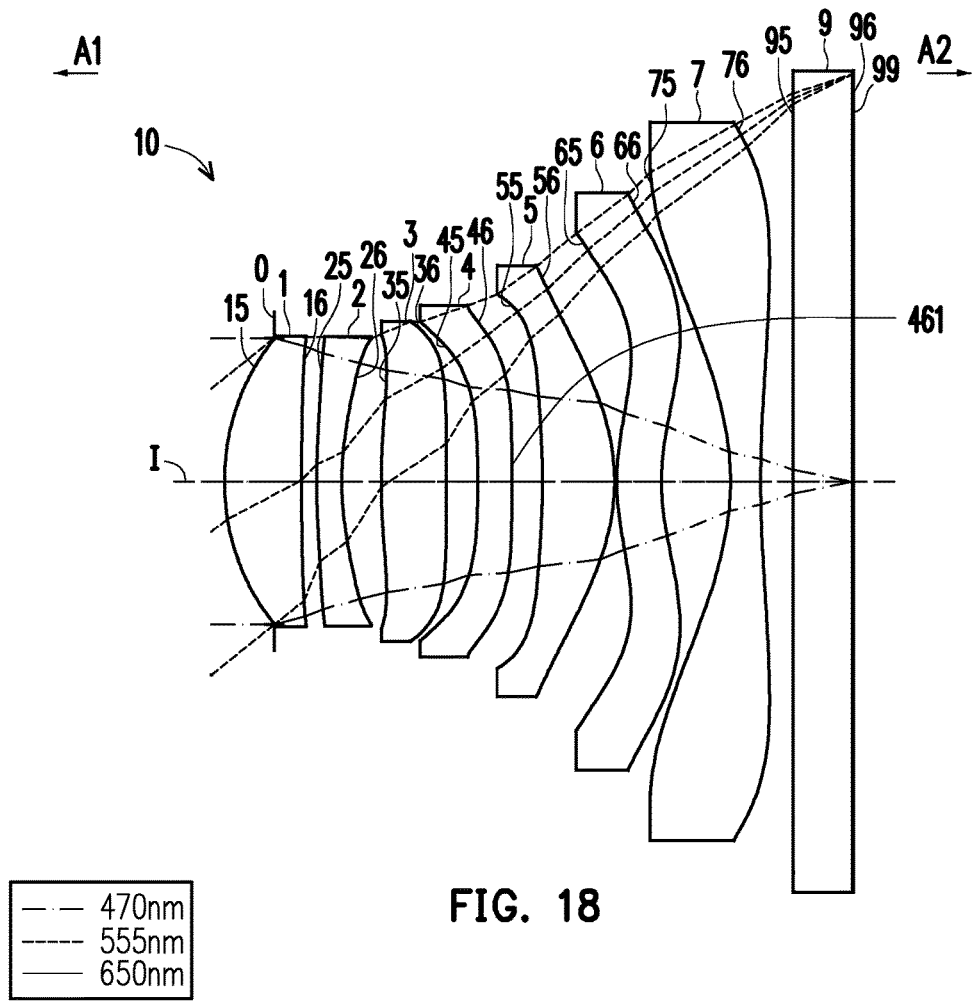
FIG. 18 is a schematic diagram illustrating an optical imaging lens according to a fourth embodiment of the invention.

FIG. 18 is a schematic diagram illustrating an optical imaging lens according to a fourth embodiment of the invention, and FIGS. 19A to 19D are diagrams illustrating a longitudinal spherical aberration and various aberrations of the optical imaging lens according to the fourth embodiment. Referring to FIG. 18, the fourth embodiment of the optical imaging lens 10 is similar to the first embodiment, and the differences therebetween mainly include the following: the optical axis region 461 of the image-side surface 46 of the fourth lens element 4 is convex in the fourth embodiment; and respective optical data, aspheric coefficients and parameters among the lens elements 1, 2, 3, 4, 5, 6, and 7 are different to a more or lesser extent. To clearly illustrate the drawing, some reference numerals indicating optical axis regions and periphery regions same as those in the first embodiment are omitted in FIG. 18.

Detailed optical data of the optical imaging lens 10 of the fourth embodiment are as shown in FIG. 20. In addition, the system length of the optical imaging lens 10 of the fourth embodiment is 5.384 mm, the EFL of the optical imaging lens element 10 of the fourth embodiment is 3.915 mm, the HFOV thereof is 38.801°, the image height thereof is 3.500 mm, and the Fno thereof is 1.616.

Respective aspheric coefficients of the object-side surface 15 of the first lens element 1 to the image-side surface 76 of the seventh lens element 7 of the fourth embodiment in Equation (1) are as shown in FIG. 21.

In addition, relations of important parameters in the optical imaging lens 10 according to the fourth embodiment are as shown in FIGS. 38 and 39.

Figures 19A, 19B, 19C, 19D:
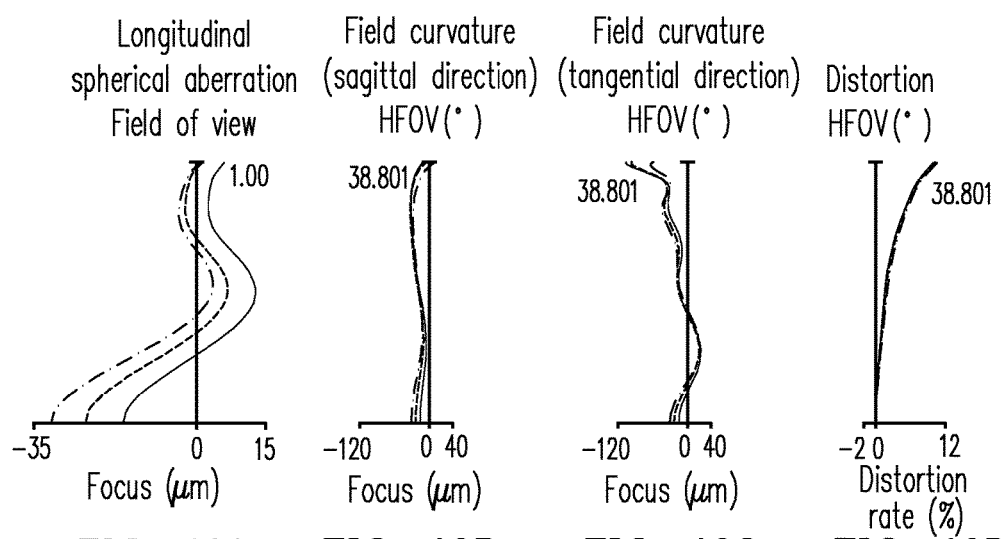
FIGS. 19A to 19D are diagrams illustrating a longitudinal spherical aberration and various aberrations of the optical imaging lens according to the fourth embodiment.

The longitudinal spherical aberration of the fourth embodiment when the pupil radius of the second embodiment is 1.2312 mm is shown in FIG. 19A, and imaging point deviations of the off-axis rays in different heights are controlled within a range of ±33 micrometers. In FIGS. 19B and 19C illustrating the field curvature aberrations, focal distance variations of the three representing wavelengths in the whole field range fall within ±110 micrometers. The distortion aberration shown in FIG. 19D indicates that the distortion aberration rate of the fourth embodiment is maintained within a range of ±11.0%. Hence, compared with the first embodiment, the fourth embodiment is easier to manufacture and therefore has a higher yield rate.

In addition, based on the above, the Fno of the fourth embodiment is smaller than that of the first embodiment, and the longitudinal spherical aberration of the fourth embodiment is more desirable over that of the first embodiment.

Figure 22:
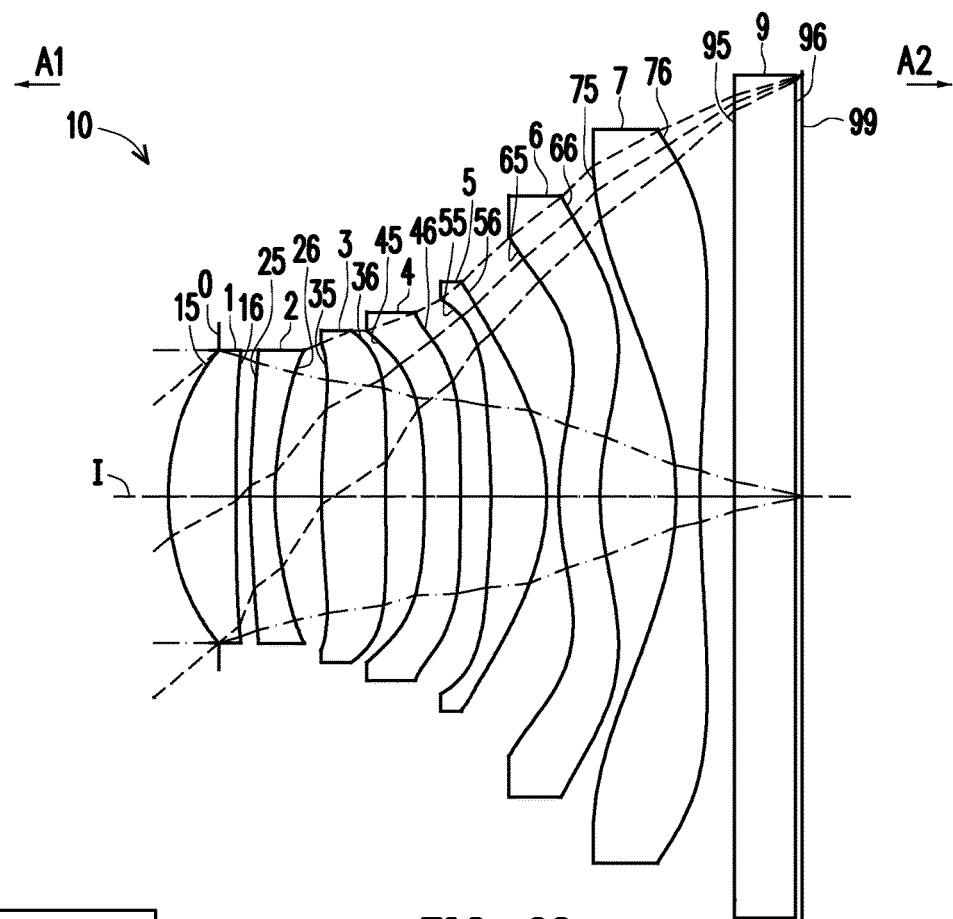
FIG. 22 is a schematic diagram illustrating an optical imaging lens according to a fifth embodiment of the invention.

FIG. 22 is a schematic diagram illustrating an optical imaging lens according to a fifth embodiment of the invention, and FIGS. 23A to 23D are diagrams illustrating a longitudinal spherical aberration and various aberrations of the optical imaging lens according to the fifth embodiment. Referring to FIG. 22, the fifth embodiment of the optical imaging lens 10 is similar to the first embodiment, and the differences therebetween mainly include the following: respective optical data, aspheric coefficients and parameters among the lens elements 1, 2, 3, 4, 5, 6, and 7 are different to a more or lesser extent; and the system length of the fifth embodiment is smaller than that of the first embodiment. To clearly illustrate the drawing, some reference numerals indicating optical axis regions and periphery regions same as those in the first embodiment are omitted in FIG. 22.

Detailed optical data of the optical imaging lens 10 of the fifth embodiment are as shown in FIG. 24. In addition, the system length of the optical imaging lens 10 of the fifth embodiment is 5.254 mm, the EFL of the optical imaging lens element 10 of the fifth embodiment is 3.860 mm, the HFOV thereof is 39.868°, the image height thereof is 3.500 mm, and the Fno thereof is 1.635.

Respective aspheric coefficients of the object-side surface 15 of the first lens element 1 to the image-side surface 76 of the seventh lens element 7 of the fifth embodiment in Equation (1) are as shown in FIG. 25.

In addition, relations of important parameters in the optical imaging lens 10 according to the fifth embodiment are as shown in FIGS. 40 and 41. In FIG. 40, the unit of parameters in the rows from T1 to GFP and from EFL to TTL is mm, and the unit of parameters in the row of HFOV is degree (°).

Figure 23A:
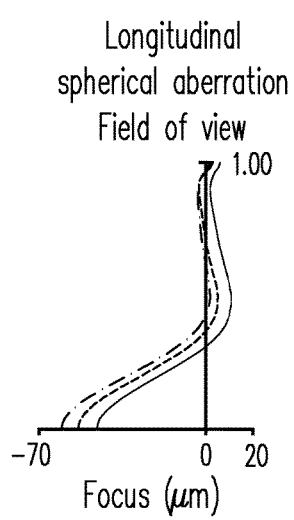
FIGS. 23A to 23D are diagrams illustrating a longitudinal spherical aberration and various aberrations of the optical imaging lens according to the fifth embodiment.
Figure 23B:
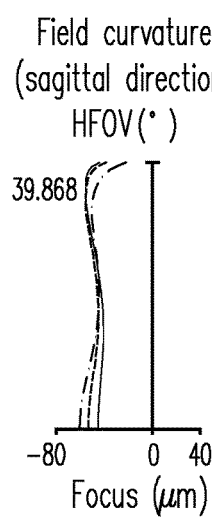
Figure 23C:
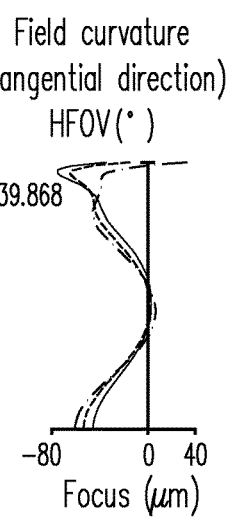
Figure 23D:
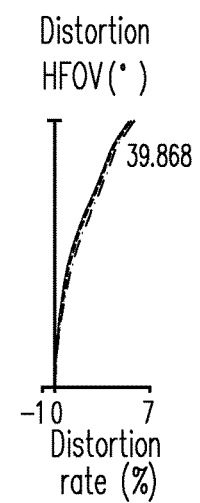

The longitudinal spherical aberration of the fifth embodiment when the pupil radius of the fifth embodiment is 1.2139 mm is shown in FIG. 23A, and imaging point deviations of the off-axis rays in different heights are controlled within a range of ±62 micrometers. In FIGS. 23B and 23C illustrating the field curvature aberrations, focal distance variations of the three representing wavelengths in the whole field range fall within ±80 micrometers. The distortion aberration shown in FIG. 23D indicates that the distortion aberration rate of the fifth embodiment is maintained within a range of ±7.0%. Based on the above, compared with the first embodiment, the fifth embodiment is able to render a desirable imaging quality under a condition that the system length is reduced to about 5.254 mm.

In addition, based on the above, the system length of the fifth embodiment is smaller than that of the first embodiment, the HFOV of the fifth embodiment is greater than the HFOV of the first embodiment, and the distortion aberration of the fifth embodiment is more desirable over that of the first embodiment.

Figure 26:
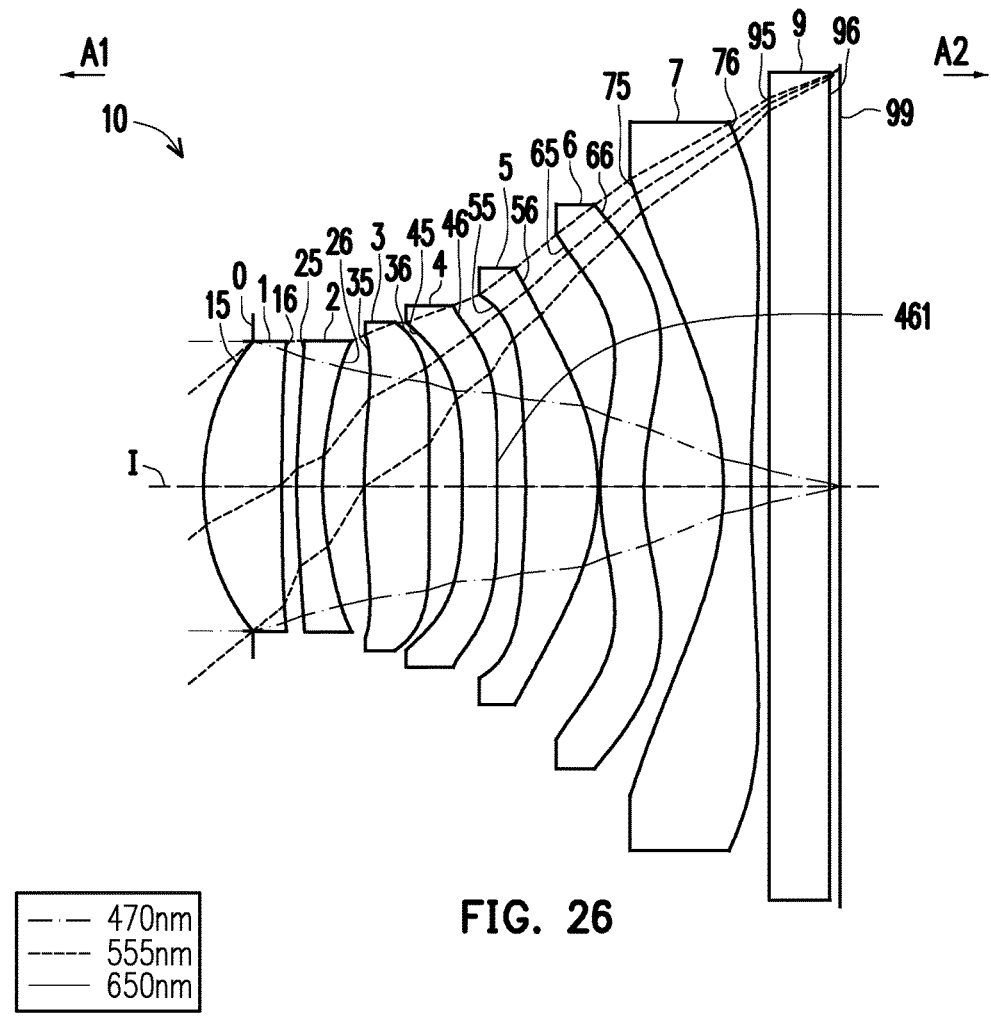
FIG. 26 is a schematic diagram illustrating an optical imaging lens according to a sixth embodiment of the invention.

FIG. 26 is a schematic diagram illustrating an optical imaging lens according to a sixth embodiment of the invention, and FIGS. 27A to 27D are diagrams illustrating a longitudinal spherical aberration and various aberrations of the optical imaging lens according to the sixth embodiment. Referring to FIG. 26, the sixth embodiment of the optical imaging lens 10 is similar to the first embodiment, and the differences therebetween mainly include the following: the optical axis region 461 of the image-side surface 46 of the fourth lens element 4 is convex in the sixth embodiment; respective optical data, aspheric coefficients and parameters among the lens elements 1, 2, 3, 4, 5, 6, and 7 are different to a more or lesser extent; and the system length of the sixth embodiment is smaller than that of the first embodiment. To clearly illustrate the drawing, some reference numerals indicating optical axis regions and periphery regions same as those in the first embodiment are omitted in FIG. 26.

Detailed optical data of the optical imaging lens 10 of the sixth embodiment are as shown in FIG. 28. In addition, the system length of the optical imaging lens 10 of the sixth embodiment is 5.316 mm, the EFL of the optical imaging lens element 10 of the sixth embodiment is 3.852 mm, the HFOV thereof is 39.100°, the image height thereof is 3.500 mm, and the Fno thereof is 1.628.

Respective aspheric coefficients of the object-side surface 15 of the first lens element 1 to the image-side surface 76 of the seventh lens element 7 of the sixth embodiment in Equation (1) are as shown in FIG. 29.

In addition, relations of important parameters in the optical imaging lens 10 according to the sixth embodiment are as shown in FIGS. 40 and 41.

Figures 27A, 27B, 27C, 27D:
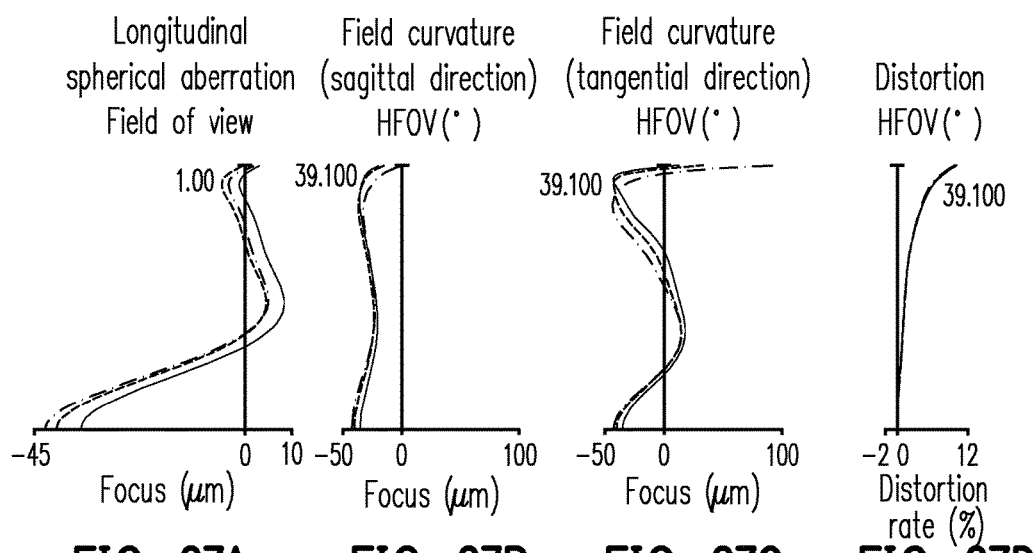
FIGS. 27A to 27D are diagrams illustrating a longitudinal spherical aberration and various aberrations of the optical imaging lens according to the sixth embodiment.

The longitudinal spherical aberration of the sixth embodiment when the pupil radius of the sixth embodiment is 1.2113 mm is shown in FIG. 27A, and imaging point deviations of the off-axis rays in different heights are controlled within a range of ±44 micrometers. In FIGS. 27B and 27C illustrating the field curvature aberrations, focal distance variations of the three representing wavelengths in the whole field range fall within ±95 micrometers. The distortion aberration shown in FIG. 27D indicates that the distortion aberration rate of the sixth embodiment is maintained within a range of ±11.0%. Based on the above, compared with the first embodiment, the sixth embodiment is able to render a desirable imaging quality under a condition that the system length is reduced to about 5.316 mm.

In addition, based on the above, the system length of the sixth embodiment is smaller than that of the first embodiment, and the longitudinal spherical aberration of the sixth embodiment is more desirable over that of the first embodiment.

Figure 30:
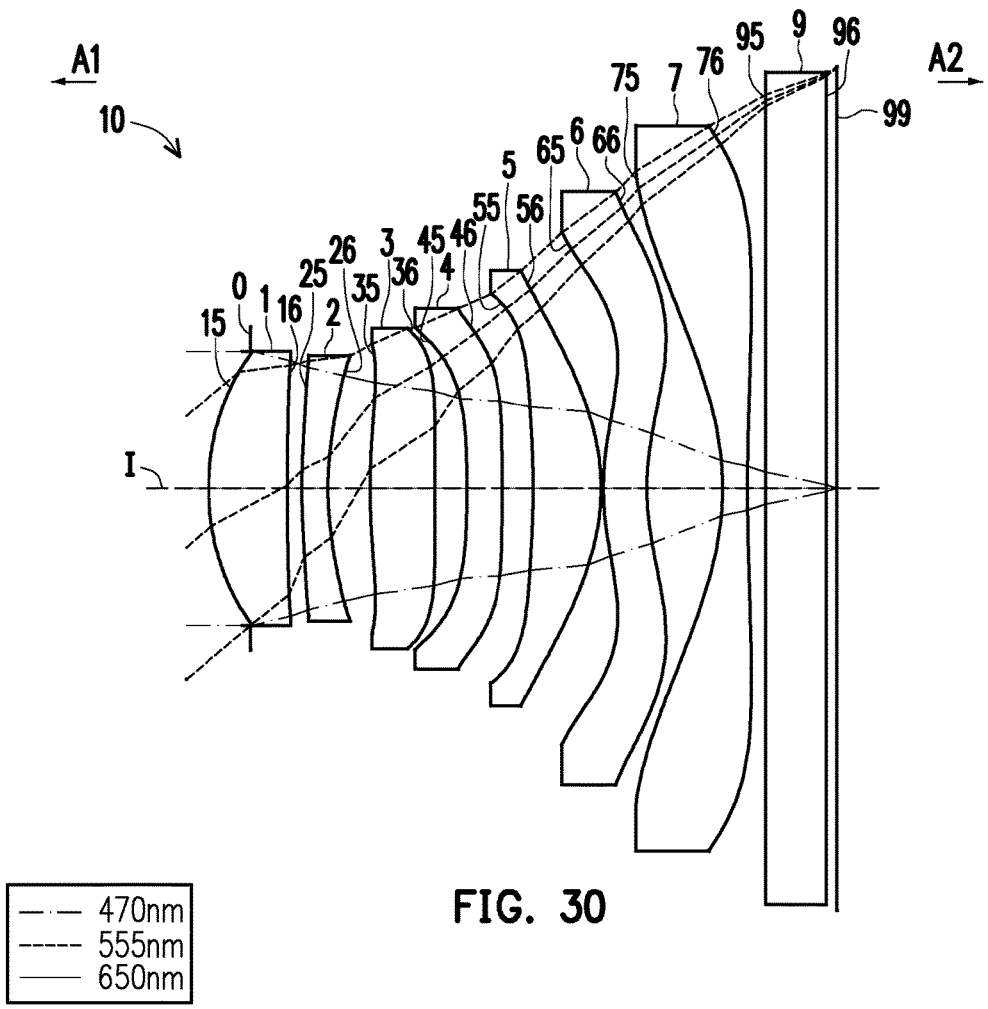
FIG. 30 is a schematic diagram illustrating an optical imaging lens according to a seventh embodiment of the invention.

FIG. 30 is a schematic diagram illustrating an optical imaging lens according to a seventh embodiment of the invention, and FIGS. 31A to 31D are diagrams illustrating a longitudinal spherical aberration and various aberrations of the optical imaging lens according to the seventh embodiment. Referring to FIG. 30, the seventh embodiment of the optical imaging lens 10 is similar to the first embodiment, and the differences therebetween mainly include the following: respective optical data, aspheric coefficients and parameters among the lens elements 1, 2, 3, 4, 5, 6, and 7 are different to a more or lesser extent; and the system length of the seventh embodiment is smaller than that of the first embodiment. To clearly illustrate the drawing, some reference numerals indicating optical axis regions and periphery regions same as those in the first embodiment are omitted in FIG. 30.

Detailed optical data of the optical imaging lens 10 of the seventh embodiment are as shown in FIG. 32. In addition, the system length of the optical imaging lens 10 of the seventh embodiment is 5.226 mm, the EFL of the optical imaging lens element 10 of the seventh embodiment is 3.626 mm, the HFOV thereof is 39.720°, the image height thereof is 3.500 mm, and the Fno thereof is 1.616.

Respective aspheric coefficients of the object-side surface 15 of the first lens element 1 to the image-side surface 76 of the seventh lens element 7 of the seventh embodiment in Equation (1) are as shown in FIG. 33.

In addition, relations of important parameters in the optical imaging lens 10 according to the seventh embodiment are as shown in FIGS. 40 and 41.

Figures 31A, 31B, 31C, 31D:
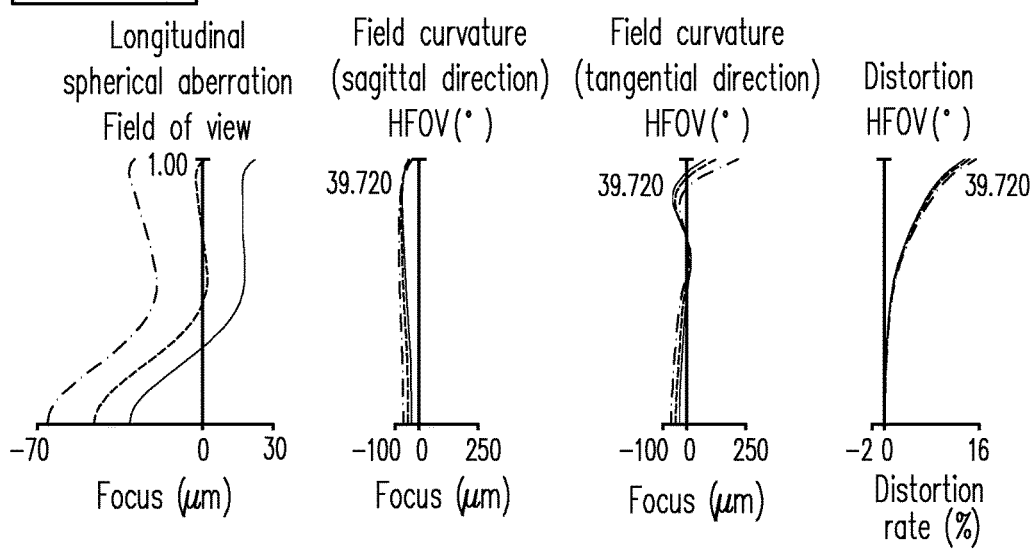
FIGS. 31A to 31D are diagrams illustrating a longitudinal spherical aberration and various aberrations of the optical imaging lens according to the seventh embodiment.

The longitudinal spherical aberration of the seventh embodiment when the pupil radius of the seventh embodiment is 1.1403 mm is shown in FIG. 31A, and imaging point deviations of the off-axis rays in different heights are controlled within a range of ±68 micrometers. In FIGS. 31B and 31C illustrating the field curvature aberrations, focal distance variations of the three representing wavelengths in the whole field range fall within ±250 micrometers. The distortion aberration shown in FIG. 31D indicates that the distortion aberration rate of the seventh embodiment is maintained within a range of ±16.0%. Based on the above, compared with the first embodiment, the seventh embodiment is able to render a desirable imaging quality under a condition that the system length is reduced to about 5.226 mm.

In addition, based on the above, the system length of the seventh embodiment is smaller than that of the first embodiment, the Fno of the seventh embodiment is less than the Fno of the first embodiment, and the HFOV of the seventh embodiment is greater than that of the first embodiment.

Figure 34:
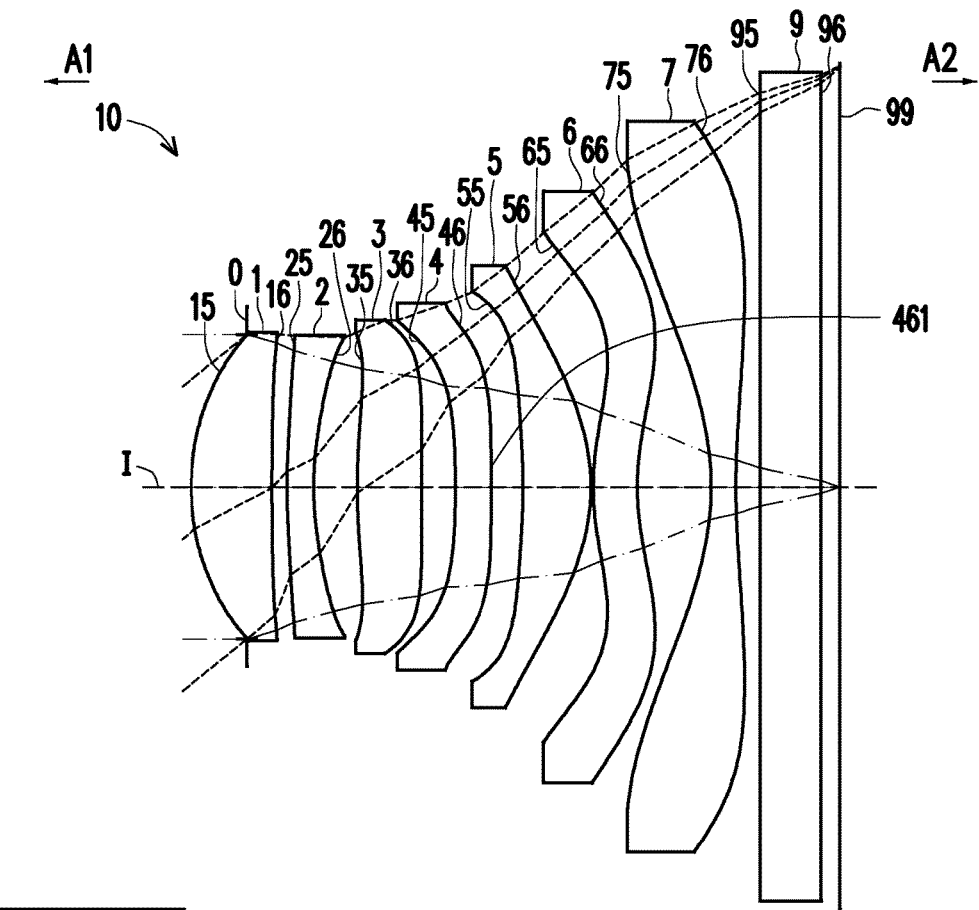
FIG. 34 is a schematic diagram illustrating an optical imaging lens according to an eighth embodiment of the invention.

FIG. 34 is a schematic diagram illustrating an optical imaging lens according to an eighth embodiment of the invention, and FIGS. 35A to 35D are diagrams illustrating a longitudinal spherical aberration and various aberrations of the optical imaging lens according to the eighth embodiment. Referring to FIG. 34, the eighth embodiment of the optical imaging lens 10 is similar to the first embodiment, and the differences therebetween mainly include the following: the optical axis region 461 of the image-side surface 46 of the fourth lens element 4 is convex in the eighth embodiment; and respective optical data, aspheric coefficients and parameters among the lens elements 1, 2, 3, 4, 5, 6, and 7 are different to a more or lesser extent. To clearly illustrate the drawing, some reference numerals indicating optical axis regions and periphery regions same as those in the first embodiment are omitted in FIG. 34.

Detailed optical data of the optical imaging lens 10 of the eighth embodiment are as shown in FIG. 36. In addition, the system length of the optical imaging lens 10 of the eighth embodiment is 5.393 mm, the EFL of the optical imaging lens element 10 of the eighth embodiment is 4.029 mm, the HFOV thereof is 38.801°, the image height thereof is 3.500 mm, and the Fno thereof is 1.603.

Respective aspheric coefficients of the object-side surface 15 of the first lens element 1 to the image-side surface 76 of the seventh lens element 7 of the eighth embodiment in Equation (1) are as shown in FIG. 37.

In addition, relations of important parameters in the optical imaging lens 10 according to the eighth embodiment are as shown in FIGS. 40 and 41.

Figure 35A:
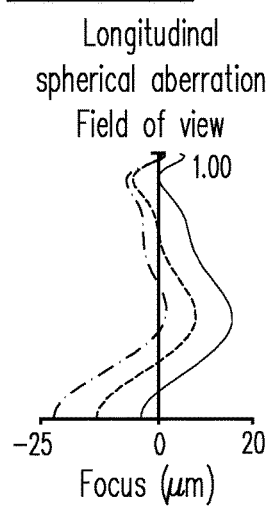
FIGS. 35A to 35D are diagrams illustrating a longitudinal spherical aberration and various aberrations of the optical imaging lens according to the eighth embodiment.
Figure 35B:
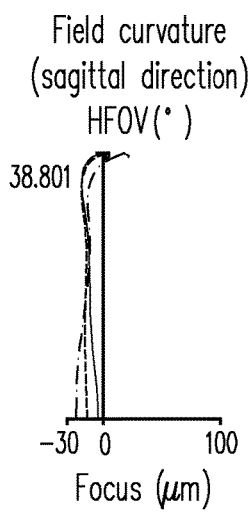
Figure 35C:
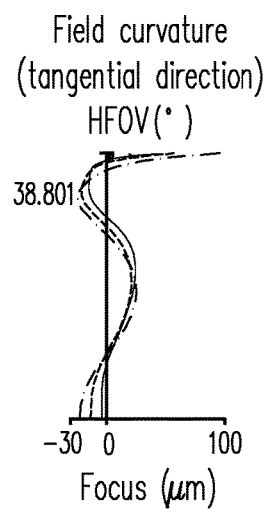
Figure 35D:
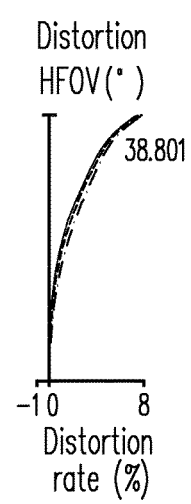

The longitudinal spherical aberration of the eighth embodiment when the pupil radius of the seventh embodiment is 1.2669 mm is shown in FIG. 35A, and imaging point deviations of the off-axis rays in different heights are controlled within a range of ±23 micrometers. In FIGS. 35B and 35C illustrating the field curvature aberrations, focal distance variations of the three representing wavelengths in the whole field range fall within ±100 micrometers. The distortion aberration shown in FIG. 35D indicates that the distortion aberration rate of the eighth embodiment is maintained within a range of ±8.0%. Hence, compared with the first embodiment, the eighth embodiment is easier to manufacture and therefore has a higher yield rate.

In addition, based on the above, the Fno of the eighth embodiment is smaller than that of the first embodiment, and the longitudinal spherical aberration and the distortion aberration of the eighth embodiment are more desirable over those of the first embodiment.

In order to reduce the system length of the lens and ensure the imaging quality, the air gap between lens elements or the thickness of the lens element may be reduced. Nevertheless, considering the manufacturing complexity, the configuration is more desirable if limitations on numerical values in the following conditions are satisfied.

Specifically, the optical imaging lens 10 may satisfy AAG/(G12+G56)≤12.000, and may preferably satisfy 6.000≤AAG/(G12+G56)≤12.000;

the optical imaging lens 10 may satisfy (G23+G67)/T4≤3.700, and may preferably satisfy 2.400≤(G23+G67)/T4≤3.700;

the optical imaging lens 10 may satisfy (T1+T3+T5)/G67≤3.200, and may preferably satisfy 2.200≤(T1+T3+T5)/G67≤3.200;

the optical imaging lens 10 may satisfy ALT/(G23+T4)≤4.700, and may preferably satisfy 3.600≤ALT/(G23+T4)≤4.700;

the optical imaging lens 10 may satisfy (T2+T4+T6+T7)/T3≤2.500, and may preferably satisfy 1.700≤(T2+T4+T6+T7)/T3≤2.500;

the optical imaging lens 10 may satisfy AAG/T1≤3.200, and may preferably satisfy 2.200≤AAG/T1≤3.200;

the optical imaging lens 10 may satisfy (T1+T6)/T5≤2.200, and may preferably satisfy 1.400≤(T1+T6)/T5≤2.200;

the optical imaging lens 10 may satisfy (T6+T7)/T2≤3.500, and may preferably satisfy 2.200≤(T6+T7)/T2≤3.500;

the optical imaging lens 10 may satisfy ALT/(G12+G34+G45)≤5.200, and may preferably satisfy 3.500≤ALT/(G12+G34+G45)≤5.200;

the optical imaging lens 10 may satisfy ALT/(G67+T7)≤4.000, and may preferably satisfy 2.800≤ALT/(G67+T7)≤4.000;

the optical imaging lens 10 may satisfy AAG/G67≤3.100, and may preferably satisfy 2.300≤AAG/G67≤3.100;

the optical imaging lens 10 may satisfy BFL/(G12+G56)≤6.500, and may preferably satisfy 2.800≤BFL/(G12+G56)≤6.500;

the optical imaging lens 10 may satisfy BFL/T5≤2.000, and may preferably satisfy 1.000≤BFL/T5≤2.000;

the optical imaging lens 10 may satisfy EFL/(T6+T7)≤7.500, and may preferably satisfy 5.300≤EFL/(T6+T7)≤7.500; and the optical imaging lens 10 may satisfy EFL/(G12+G34+G45)≤6.900, and may preferably satisfy 5.300≤EFL/(G12+G34+G45)≤6.900.

A ratio between an optical device parameter and a lens length of the optical imaging lens 10 is maintained at an appropriate value at least to avoid an excessively small parameter that may affect production and manufacture or an excessively great parameter that may render an excessively long lens. Thus, the configuration is more desirable if limitations on numerical values in the following conditions are satisfied.

Specifically, the optical imaging lens 10 may satisfy TTL/(G23+G67)≤6.300, and may preferably satisfy 5.00≤TTL/(G23+G67)≤6.300;

the optical imaging lens 10 may satisfy TTL/(T3+T5)≤5.700, and may preferably satisfy 4.300 TTL/(T3+T5)≤5.700; and the optical imaging lens 10 may satisfy TL/(T4+T7)≤8.900, and may preferably satisfy 6.800≤TL/(T4+T7)≤8.900.

Besides, for lens designs having frameworks similar to that of the embodiments of the invention, limitations on the lens may be added by choosing an arbitrary combination/relation of the parameters of the embodiments. Considering the unpredictability in the design of optical system, under the framework of the embodiments of the invention, the lens according to the embodiments of the invention may have a shorter lens length, a greater applicable aperture, a desirable imaging quality, or a facilitated assembling yield rate if the above conditions are satisfied.

An arbitrary number of the exemplary limiting relations listed above may also be arbitrarily and optionally combined and incorporated into the embodiments of the invention. The invention shall not be construed as being limited thereto. When carrying out the embodiments of the invention, in addition to the above relations, the designer may further set other additional structural details of a specific lens elements or a plurality of lens elements in general, such as arrangements of concave/convex surfaces of lens elements, so as to reinforce the control over the system performance and/or the resolution. For example, a convex surface located at the optical axis region may be optionally and additionally formed on the object-side surface of the first lens element. It should be noted that these details may be optionally incorporated and applied in other embodiments of the invention, if not conflicting.

In view of the foregoing, the optical imaging lens 10 according to one or some exemplary embodiments of the invention is able to render one or some of the following:

i. The longitudinal spherical aberrations, the astigmatic aberrations, and the distortion aberrations of the respective embodiments of the invention meet the standard of use. In addition, the off-axis rays of the three representing wavelengths, i.e., red, green, and blue, in different heights are all concentrated at the imaging point. The extents of deviation of the respective curves show that the imaging point deviations of the off-axis rays in different heights are controlled, so a desirable suppressing ability against spherical aberration, image aberration, and distortion aberration is rendered. The imaging quality data further suggest that the distances among the three representing wavelengths, i.e., red, green, and blue, are close to each other, indicating that the embodiments of the invention are able to desirably concentrate rays of different wavelengths in various states. Therefore, the embodiments of the invention exhibit an excellent chromatic dispersion suppressing ability. In view of the foregoing, by designing and matching the lens elements in the embodiments of the invention, a desirable imaging quality is rendered.

ii. The first lens element 1 according to the embodiments of the invention has positive refracting power, and the periphery region 164 of the image-side surface 16 of the first lens element 1 is designed to be concave to facilitate the convergence of rays.

iii. According to the embodiments of the invention, the periphery region 354 on the object-side surface 35 of the third lens element 3 is designed to be concave and the optical axis region 662 of the image-side surface 66 of the sixth lens element 6 is concave, while the optical axis region 262 of the image-side surface 26 of the second lens element 2 is concave or the periphery region 454 of the object-side surface 45 of the fourth lens element 4 is concave. Thus, the image aberration generated may be corrected.

iv. When the embodiments of the invention further satisfy the conditions of V5+V6+V7≤150.000 and (G67+G23)/(T6+T4)≥1.200, the system length of the lens may be reduced, and the imaging quality is ensured. The range of V5+V6+V7 may preferably be 120.000≤V5+V6+V7≤150.000, and the range of (G67+G23)/(T6+T4) may preferably be 1.200≤(G67+G23)/(T6+T4)≤1.800.

The maximum and minimum numeral values and the values therebetween derived from the combinations of the optical parameters disclosed in the embodiments of the invention may all be applicable and enable people skill in the pertinent art to implement the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical imaging lens, sequentially comprising a first lens element, a second lens element, a third lens element, a fourth lens element, a fifth lens element, a sixth lens element, and a seventh lens element along an optical axis from an object side to an image side, each of the lens elements having an object-side surface facing toward the object side and allowing imaging rays to pass through and an image-side surface facing toward the image side and allowing the imaging rays to pass through, and the seven lens elements described above being the only lens elements having refracting power in the optical imaging lens, wherein:

the first lens element has positive refracting power, and a periphery region of the image-side surface of the first lens element is concave, an optical axis region of the image-side surface of the second lens element is concave, a periphery region of the object-side surface of the third lens element is concave, a periphery region of the image-side surface of the fifth lens element is convex, an optical axis region of the image-side surface of the sixth lens element is concave, and the optical imaging lens meets conditions as follows:

$$V5+V6+V7 \leq 150.000;$$

$$(G67+G23)/(T6+T4) \geq 1.200,$$

wherein V5 is an Abbe number of the fifth lens element, V6 is an Abbe number of the sixth lens element, V7 is an Abbe number of the seventh lens element, G67 is an air gap on the optical axis from the sixth lens element to the seventh lens element, G23 is an air gap on the optical axis from the second lens element to the third lens element, T6 is a central thickness of the sixth lens element on the optical axis, and T4 is a central thickness of the fourth lens element on the optical axis.

2. The optical imaging lens as claimed in claim 1, wherein the optical imaging lens further satisfies a condition as follows: AAG/(G12+G56)≤12.000, wherein AAG is a total of six air gaps on the optical axis from the first lens element to the seventh lens element, G12 is an air gap on the optical axis from the first lens element to the second lens element, and G56 is an air gap on the optical axis from the fifth lens element to the sixth lens element.

3. The optical imaging lens as claimed in claim 1, wherein the optical imaging lens further satisfies a condition as follows: (G23+G67)/T4≤3.700.

4. The optical imaging lens as claimed in claim 1, wherein the optical imaging lens further satisfies a condition as follows: (T1+T3+T5)/G67≤3.200, wherein T1 is a central thickness of the first lens element on the optical axis, T3 is a central thickness of the third lens element on the optical axis, and T5 is a central thickness of the fifth lens element on the optical axis.

5. The optical imaging lens as claimed in claim 1, wherein the optical imaging lens further satisfies a condition as follows: ALT/(G23+T4)≤4.700, wherein ALT is a total of central thicknesses of the seven lens elements comprising the first lens element to the seventh lens element on the optical axis.

6. The optical imaging lens as claimed in claim 1, wherein the optical imaging lens further satisfies a condition as follows: (T2+T4+T6+T7)/T3≤2.500, wherein T2 is a central thickness of the second lens element on the optical axis, T7 is a central thickness of the seventh lens element on the optical axis, and T3 is a central thickness of the third lens element on the optical axis.

7. The optical imaging lens as claimed in claim 1, wherein the optical imaging lens further satisfies a condition as follows: AAG/T1≤3.200, wherein AAG is a total of six air gaps on the optical axis from the first lens element to the seventh lens element, and T1 is a central thickness of the first lens element on the optical axis.

8. The optical imaging lens as claimed in claim 1, wherein the optical imaging lens further satisfies a condition as follows: (T1+T6)/T5≤2.200, wherein T1 is a central thickness of the first lens element on the optical axis, and T5 is a central thickness of the fifth lens element on the optical axis.

9. The optical imaging lens as claimed in claim 1, wherein the optical imaging lens further satisfies a condition as follows: (T6+T7)/T2≤3.500, wherein T7 is a central thickness of the seventh lens element on the optical axis, and T2 is a central thickness of the second lens element on the optical axis.

10. The optical imaging lens as claimed in claim 1, wherein the optical imaging lens further satisfies a condition as follows: ALT/(G12+G34+G45)≤5.200, wherein ALT is a total of central thicknesses of the seven lens elements comprising the first lens element to the seventh lens element on the optical axis, G12 is an air gap on the optical axis from the first lens element to the second lens element, G34 is an air gap on the optical axis from the third lens element to the fourth lens element, and G45 is an air gap on the optical axis from the fourth lens element to the fifth lens element.

11. An optical imaging lens, sequentially comprising a first lens element, a second lens element, a third lens element, a fourth lens element, a fifth lens element, a sixth lens element, and a seventh lens element along an optical axis from an object side to an image side, each of the lens elements having an object-side surface facing toward the object side and allowing imaging rays to pass through and an image-side surface facing toward the image side and allowing the imaging rays to pass through, and the seven lens elements described above being the only lens elements having refracting power in the optical imaging lens, wherein:
the first lens element has positive refracting power, and a periphery region of the image-side surface of the first lens element is concave,
a periphery region of the object-side surface of the third lens element is concave,
a periphery region of the object-side surface of the fourth lens element is concave,
a periphery region of the image-side surface of the fifth lens element is convex,
an optical axis region of the image-side surface of the sixth lens element is concave, and
the optical imaging lens meets conditions as follows:

$$V5+V6+V7 \le 150.000;$$

$$(G67+G23)/(T6+T4) \ge 1.200$$

wherein V5 is an Abbe number of the fifth lens element, V6 is an Abbe number of the sixth lens element, V7 is an Abbe number of the seventh lens element, G67 is an air gap on the optical axis from the sixth lens element to the seventh lens element, G23 is an air gap on the optical axis from the second lens element to the third lens element, T6 is a central thickness of the sixth lens element on the optical axis, and T4 is a central thickness of the fourth lens element on the optical axis.

12. The optical imaging lens as claimed in claim 11, wherein the optical imaging lens further satisfies a condition as follows: BFL/(G12+G56)≤6.500, wherein BFL is a distance on the optical axis from the image-side surface of the seventh lens element to an image plane, G12 is an air gap on the optical axis from the first lens element to the second lens element, and G56 is an air gap on the optical axis from the fifth lens element to the sixth lens element.

13. The optical imaging lens as claimed in claim 11, wherein the optical imaging lens further satisfies a condition as follows: TTL/(G23+G67)≤6.300, wherein TTL is a distance on the optical axis from the object-side surface of the first lens element to an image plane.

14. The optical imaging lens as claimed in claim 11, wherein the optical imaging lens further satisfies a condition as follows: TTL/(T3+T5)≤5.700, wherein TTL is a distance on the optical axis from the object-side surface of the first lens element to an image plane, T3 is a central thickness of the third lens element on the optical axis, and T5 is a central thickness of the fifth lens element on the optical axis.

15. The optical imaging lens as claimed in claim 11, wherein the optical imaging lens further satisfies a condition as follows: ALT/(G67+T7)≤4.000, wherein ALT is a total of central thicknesses of the seven lens elements comprising the first lens element to the seventh lens element on the optical axis, and T7 is the central thickness of the seventh lens element on the optical axis.

16. The optical imaging lens as claimed in claim 11, wherein the optical imaging lens further satisfies a condition as follows: TL/(T4+T7)≤8.900, wherein TL is a distance on the optical axis from the object-side surface of the first lens element to the image-side surface of the seventh lens element, and T7 is a central thickness of the seventh lens element on the optical axis.

17. The optical imaging lens as claimed in claim 11, wherein the optical imaging lens further satisfies a condition as follows: AAG/G67≤3.100, wherein AAG is a total of six air gaps on the optical axis from the first lens element to the seventh lens element.

18. The optical imaging lens as claimed in claim 11, wherein the optical imaging lens further satisfies a condition as follows: BFL/T5≤2.000, wherein BFL is a distance on the optical axis from the image-side surface of the seventh lens element to an image plane, and T5 is a central thickness of the fifth lens element on the optical axis.

19. The optical imaging lens as claimed in claim 11, wherein the optical imaging lens further satisfies a condition as follows: $EFL/(T6+T7) \leq 7.500$, wherein EFL is an effective focal length of an optical lens system, and T7 is a central thickness of the seventh lens element on the optical axis.

20. The optical imaging lens as claimed in claim 11, wherein the optical imaging lens further satisfies a condition as follows: $EFL/(G12+G34+G45) \leq 6.900$, wherein EFL is an effective focal length of an optical lens system, G12 is an air gap on the optical axis from the first lens element to the second lens element, G34 is an air gap on the optical axis from the third lens element to the fourth lens element, and G45 is an air gap on the optical axis from the fourth lens element to the fifth lens element.

\* \* \* \* \*